(12) United States Patent
Schindler et al.

(10) Patent No.: US 12,087,003 B2
(45) Date of Patent: Sep. 10, 2024

(54) AUTO CALIBRATION FROM EPIPOLAR LINE DISTANCE IN PROJECTION PATTERN

(71) Applicant: TRINAMIX GMBH, Ludwigshafen am Rhein (DE)

(72) Inventors: Patrick Schindler, Ludwigshafen (DE); Friedrich Schick, Ludwigshafen (DE); Christian Lennartz, Ludwigshafen (DE); Peter Schillen, Ludwigshafen (DE); Jakob Unger, Freiburg im Breisgau (DE)

( * ) Notice: Subject to any disclaimer, the term of this patent is extended or adjusted under 35 U.S.C. 154(b) by 0 days.

(21) Appl. No.: 18/363,420

(22) Filed: Aug. 1, 2023

(65) Prior Publication Data

US 2024/0020864 A1 Jan. 18, 2024

Related U.S. Application Data

(63) Continuation of application No. PCT/EP2022/064655, filed on May 30, 2022.

(30) Foreign Application Priority Data

May 31, 2021 (EP) ..................................... 21176939

(51) Int. Cl.
   *G06T 7/521* (2017.01)
   *G06T 7/80* (2017.01)
(52) U.S. Cl.
   CPC ................ *G06T 7/521* (2017.01); *G06T 7/80* (2017.01)
(58) Field of Classification Search
   CPC .................................. G06T 7/521; G06T 7/80
   See application file for complete search history.

(56) References Cited

U.S. PATENT DOCUMENTS

| | | | | |
|---|---|---|---|---|
| 5,712,463 A | * | 1/1998 | Singh ..................... | G11B 21/21 219/121.76 |
| 6,798,613 B1 | * | 9/2004 | Krajnovich .......... | G11B 5/6005 360/99.18 |
| 10,520,742 B1 | * | 12/2019 | Sulai ................... | G02B 27/0172 |
| 2003/0071121 A1 | * | 4/2003 | Kricorissian ...... | G06K 7/10732 235/454 |
| 2003/0160960 A1 | * | 8/2003 | Noguchi .............. | G01B 11/272 356/401 |
| 2005/0117140 A1 | * | 6/2005 | Mishima ............... | G03F 9/7065 355/72 |
| 2005/0165561 A1 | * | 7/2005 | Zeng ........................ | G11B 5/56 702/41 |
| 2006/0019503 A1 | * | 1/2006 | Takami ................. | H01L 21/268 438/795 |

(Continued)

OTHER PUBLICATIONS

International Search Report and Written Opinion for corresponding PCT/EP22/64655, dated Aug. 18, 2022, 8 pages.

*Primary Examiner* — Zaihan Jiang
(74) *Attorney, Agent, or Firm* — Armstrong Teasdale LLP

(57) ABSTRACT

A detector for determining a position of at least one object, the detector including:
   at least one projector for illuminating the object with at least one illumination pattern;
   at least one sensor element having a matrix of optical sensors; and
   at least one evaluation device configured for determining initial distance information of reflection features by analysis of their respective beam profiles, where the evaluation device is configured for performing a calibration method.

30 Claims, 3 Drawing Sheets

(56) References Cited

U.S. PATENT DOCUMENTS

| | | | |
|---|---|---|---|
| 2014/0330133 A1* | 11/2014 | Stern | A61B 5/02007 |
| | | | 600/509 |
| 2018/0172972 A1* | 6/2018 | Gershman | G02B 21/06 |
| 2018/0249142 A1* | 8/2018 | Hicks | H04N 13/239 |
| 2019/0101767 A1* | 4/2019 | Geng | G02B 27/141 |
| 2020/0371237 A1* | 11/2020 | Schindler | G01S 7/4802 |

* cited by examiner

AUTO CALIBRATION FROM EPIPOLAR LINE DISTANCE IN PROJECTION PATTERN

CROSS-REFERENCE TO RELATED APPLICATIONS

This application is a bypass U.S. Continuation Application of International Patent Application No. PCT/EP22/64655, filed May 30, 2022, which claims priority to European Patent Application No. 21176939.3, filed May 31, 2021, each of which is hereby incorporated by reference herein.

FIELD OF THE INVENTION

The invention relates to a detector for determining a position of at least one object and a method for calibrating said detector. The invention further relates to various uses of the detector. The devices, methods and uses according to the present invention specifically may be employed for example in various areas of daily life, gaming, traffic technology, production technology, security technology, photography such as digital photography or video photography for arts, documentation or technical purposes, medical technology or in the sciences. Further, the invention specifically may be used for scanning one or more objects and/or for scanning a scenery, such as for generating a depth profile of an object or of a scenery, e.g. in the field of architecture, metrology, archaeology, arts, medicine, engineering or manufacturing. However, other applications are also possible.

PRIOR ART

An active triangulation system typically comprises at least one camera and at least one light projector, e.g. structured light systems. Other triangulation systems like stereo cameras may comprise at least of two cameras. For a proper three dimensional reconstruction by triangulation the knowledge about the position and rotation of the components like camera and projector are essential. Additionally, the three dimensional reconstruction by triangulation requires also a solved correspondence of important points on the scene, e.g. laser spots, light spots of the projector or detected edges captured by the camera. The three dimensional position can be computed by the known translation and relative rotation of the camera to the projector. This parameter defines the extrinsic calibration of a triangulation system. Thus, the quality of the three dimensional measurement results depends on the extrinsic calibration. Depending on the hardware, already calibrated systems can be degenerated by physical stress or temperature shifts, i.e. relative position and rotation changes in time. This may yield to false measurement results. Obviously, the system can be repaired by an additional new calibration process. Depending on the application this may also be time consuming and not practical. A calibration process may be based on capturing static scenes with defined targets on known distances.

Concepts for recalibration algorithms already exists, e.g. E. Rehder et al., "Online Stereo Camera Calibration From Scratch", June 2017, Conference: 2017 IEEE Intelligent Vehicles Symposium, DOI:10.1109/IVS.2017.7995952 and T. Dang, "Continuous Stereo Self-Calibration by Camera Parameter Tracking", August 2009 IEEE Transactions on Image Processing 8(7):1536-50, DOI:10.1109/TIP.2009.2017824.

These recalibration approaches are based on finding correspondences of features that must fulfill an equation system (e.g. epipolar condition) with respect to the extrinsic parameters. Famous example is the eight-point algorithm. For example, in case of a three dimensional measurement system with one camera and a laser dot projector, the laser spots on the captured camera image may be assumed to be correctly assigned to the laser grid. That means that the correspondences are correctly found. The position of the laser spots on the camera image and the relation of the reference laser grids can be used to get a linear equation system. This linear equation requires at least eight corresponding laser spots to the reference grid. This equation can be solved by a least square fit. An adept usage of the singular value decomposition may determine the rotation and translation of camera and laser projector. However, the results may become very poorly if the correspondences are false. A proper outlier detection of false correspondences may be very important for that kind of method.

This procedure may works also for stereo measurements. However, it may be necessary to find corresponding features in both camera images, e.g. edges or corners in the image. The position of that features may be used to determine for example the eight-point method.

Generally, 3d reconstruction methods for structured light or stereo may require an extrinsic calibrated system. That means that the search for correspondences are based on epipolar lines. However, this kind of search is only one dimensional. In case of a not calibrated system, the search of correspondences may not work anymore for one dimensional epipolar lines. State of the art recalibration methods must search correspondences in the two dimensional image domain. This may yield to an additional search algorithm of correspondences on top of the three dimensional reconstruction.

Problem Addressed by the Invention

It is therefore an object of the present invention to provide devices and methods facing the above-mentioned technical challenges of known devices and methods. Specifically, it is an object of the present invention to provide devices and methods allowing automatic recalibration algorithm for a three dimensional camera, preferably allowing correcting false measurement values on the fly without starting a new static calibration process.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

In a first aspect of the present invention, a detector for determining a position of at least one object is disclosed.

As used herein, the term "object" refers to an arbitrary object, in particular a surface or region, which is configured to reflect at least partially at least one light beam impinging on the object. The light beam may originate from a projector of the detector illuminating the object, wherein the light beam is reflected or scattered by the object.

As used herein, the term "position" refers to at least one item of information regarding a location and/or orientation of the object and/or at least one part of the object in space. Thus, the at least one item of information may imply at least one distance between at least one point of the object and the at least one detector. The distance may be a longitudinal coordinate or may contribute to determining a longitudinal coordinate of the point of the object. Additionally or alternatively, one or more other items of information regarding the location and/or orientation of the object and/or at least one part of the object may be determined. As an example, additionally, at least one transversal coordinate of the object and/or at least one part of the object may be determined. Thus, the position of the object may imply at least one longitudinal coordinate of the object and/or at least one part of the object. Additionally or alternatively, the position of the object may imply at least one transversal coordinate of the object and/or at least one part of the object. Additionally or alternatively, the position of the object may imply at least one orientation information of the object, indicating an orientation of the object in space.

The detector comprises:
- at least one projector for illuminating the object with at least one illumination pattern, wherein the illumination pattern comprises a plurality of illumination features;
- at least one sensor element having a matrix of optical sensors, the optical sensors each having a light-sensitive area, wherein each optical sensor is designed to generate at least one sensor signal in response to an illumination of its respective light-sensitive area by a reflection light beam propagating from the object to the detector, wherein the sensor element is configured to determine at least one reflection image comprising a plurality of reflection features, wherein each of the reflection features comprises a beam profile;
- at least one evaluation device configured for determining initial distance information of the reflection features by analysis of their respective beam profiles, wherein the analysis of a beam profile comprises evaluating a combined signal Q from the respective sensor signals, wherein the evaluation device is configured for performing a calibration method comprising:
  a) matching the reflection features to reference features of a reference image considering the initial distance information thereby determining pairs of matched reflection and reference features;
  b) determining an epipolar line of the matched reference feature in the reference image for each of the pairs of matched reflection and reference features;
  c) determining an epipolar line distance d of the matched reflection feature to said epipolar line;
  d) evaluating the epipolar line distances d as a function of an image position (x,y) in the reference image thereby determining a geometric pattern;
  e) determining at least one correction for rotation and/or translation of the reflection image depending on the geometric pattern.

As used herein, the term "projector", also denoted as light projector, refers to an optical device configured to project at least one illumination pattern onto the object, specifically onto a surface of the object. The projector may comprise at least one light source, also denoted illumination device or illumination source, configured for generating at least one light beam. The projector may be configured for generating at least one pattern and for projecting the pattern towards at least one surface or scene comprising the object. The projector may be configured such that the illumination patterns propagate from the projector, in particular from at least one opening of a housing of the projector, towards the object. The projector may be configured for generating and/or to project a cloud of points, for example the projector may comprise at least one digital light processing (DLP) projector, at least one LCoS projector, at least one laser source, at least one array of laser sources; at least one light emitting diode; at least one array of light emitting diodes. Additionally, an additional illumination pattern may be generated by at least one ambient light source.

As used herein, the term "pattern" refers to an arbitrary known or pre-determined arrangement comprising at least one arbitrarily shaped feature. The pattern may comprise at least one feature such as a point or symbol. The pattern may comprise a plurality of features. The pattern may comprise an arrangement of periodic or non-periodic features. As used herein, the term "illumination pattern" refers to a pattern generated and projected by the projector, in particular which used for illuminating the object. As used herein, the term "illumination feature" refers to at least one arbitrary shaped feature of the illumination pattern. The illumination pattern may comprise at least one periodic regular pattern selected from the group consisting of: at least one periodic regular point pattern; at least one hexagonal pattern; at least one rectangular pattern. For example, the projector may be configured for generating and/or for projecting a cloud of points. For example, the projector may be configured for generating a cloud of points such that the illumination pattern may comprise a plurality of point features.

The projector may be configured to generate a plurality of illumination patterns each comprising a plurality of illumination features. The projector may be configured to project two, three, four, five or more illumination patterns each comprising a plurality of illumination features. The illumination patterns may differ, specifically in one or more of number of illumination features, arrangement of illumination features, shape of illumination features, wavelength of illumination features, intensity of illumination features, opening angle and the like.

The projector may comprise at least one transfer device, in particular at least one diffractive optical element, configured for generating the illumination pattern from at least one light beam generated by the laser source. The term "transfer device", also denoted as "transfer system", may generally refer to one or more optical elements which are configured for modifying the light beam, such as by modifying one or more of a beam parameter of the light beam, a width of the light beam or a direction of the light beam. The transfer device specifically may comprise one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system.

The transfer device may have an optical axis. In particular, the detector and the transfer device have a common optical axis. As used herein, the term "optical axis of the transfer device" generally refers to an axis of mirror symmetry or rotational symmetry of the lens or lens system. The optical axis of the detector may be a line of symmetry of the optical setup of the detector. The detector comprises at least one transfer device, preferably at least one transfer system having at least one lens. The transfer system, as an example, may comprise at least one beam path, with the elements of the transfer system in the beam path being located in a rotationally symmetrical fashion with respect to the optical axis. Still, as will also be outlined in further detail below, one or more optical elements located within the beam path may also be off-centered or tilted with respect to the optical axis. In this case, however, the optical axis may be defined sequentially, such as by interconnecting the centers of the optical elements in the beam path, e.g. by interconnecting the centers of the lenses, wherein, in this context, the optical sensors are not counted as optical elements. The optical axis generally may denote the beam path. Therein, the detector may have a single beam path along which a light beam may travel from the object to the optical sensors, or may have a plurality of beam paths. As an example, a single beam path may be given or the beam path may be split into two or more partial beam paths. In the latter case, each partial beam path may have its own optical axis. The optical sensors may be located in one and the same beam path or partial beam path. Alternatively, however, the optical sensors may also be located in different partial beam paths.

The transfer device may constitute a coordinate system, wherein a longitudinal coordinate I is a coordinate along the optical axis and wherein d is a spatial offset from the optical axis. The coordinate system may be a polar coordinate system in which the optical axis of the transfer device forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate z. Any direction perpendicular to the z-axis may be considered a transversal direction, and the polar coordinate and/or the polar angle may be considered a transversal coordinate.

As used herein, the term "beam" generally refers to a collection of rays. In the following, the terms "ray" and "beam" will be used as synonyms. As further used herein, the term "light beam" generally refers to an amount of light, specifically an amount of light traveling essentially in the same direction, including the possibility of the light beam having a spreading angle or widening angle.

The light beam may comprise at least one beam profile. The light beam may have a spatial extension. Specifically, the light beam may have a non-Gaussian beam profile. The beam profile may be selected from the group consisting of a trapezoid beam profile; a triangle beam profile; a conical beam profile. The trapezoid beam profile may have a plateau region and at least one edge region. The light beam may be a Gaussian light beam or a linear combination of Gaussian light beams. As used herein, the term "beam profile" relates to a spatial distribution, in particular in at least one plane perpendicular to the propagation of the light beam, of an intensity of the light beam. The beam profile may be a transverse intensity profile of the light beam. The beam profile may be a cross section of the light beam. The beam profile may be selected from the group consisting of a trapezoid beam profile; a triangle beam profile; a conical beam profile and a linear combination of Gaussian beam profiles. Other embodiments are feasible, however. The projector may comprise the at least one transfer device which may be configured for one or more of adjusting, defining and determining the beam profile, in particular a shape of the beam profile.

For example, the projector may comprise at least one illumination source such as a single light source, in particular a single laser source, configured for generating at least one light beam, also denoted laser beam. The projector may comprise at least one transfer device for diffracting and for replicating the laser beam generated by the single laser source for generating the illumination pattern comprising the patterned illumination features. In particular, the projector comprises the at least one diffractive optical element for diffracting and replicating the light beam. The diffractive optical element may be configured for beam shaping and/or beam splitting. As used herein, the term "replicating" may refer to generating a plurality of light beams from one light beam, in particular multiplying the light beam.

Additionally or alternatively, for example, the projector may comprise at least one array of densely packed light sources, in particular laser sources, according to a certain pattern configured for generating a cluster of light beams. As used herein, the term "densely packed" light sources may refer to a plurality of light sources arranged in a cluster. The density of the light sources may depend on extension of a housing of the individual light sources and distinguishability of the light beams. The projector may comprise the at least one transfer device for diffracting and replicating the cluster of light beams for generating the illumination pattern comprising patterned illumination features.

As used herein, the term "sensor element" generally refers to a device or a combination of a plurality of devices configured for sensing at least one parameter. In the present case, the parameter specifically may be an optical parameter, and the sensor element specifically may be an optical sensor element. The sensor element may be formed as a unitary, single device or as a combination of several devices. As further used herein, the term "matrix" generally refers to an arrangement of a plurality of elements in a predetermined geometrical order. The matrix, as will be outlined in further detail below, specifically may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible.

The optical sensors of the matrix specifically may be equal in one or more of size, sensitivity and other optical, electrical and mechanical properties. The light-sensitive areas of all optical sensors of the matrix specifically may be located in a common plane, the common plane preferably facing the object, such that a light beam propagating from the object to the detector may generate a light spot on the common plane.

As used herein, an "optical sensor" generally refers to a light-sensitive device for detecting a light beam, such as for detecting an illumination and/or a light spot generated by at least one light beam. As further used herein, a "light-sensitive area" generally refers to an area of the optical sensor which may be illuminated externally, by the at least one light beam, in response to which illumination the at least one sensor signal is generated. The light-sensitive area may specifically be located on a surface of the respective optical sensor. Other embodiments, however, are feasible. As used herein, the term "the optical sensors each having at least one light sensitive area" refers to configurations with a plurality of single optical sensors each having one light sensitive area and to configurations with one combined optical sensor having a plurality of light sensitive areas. Thus, the term "optical sensor" furthermore refers to a light-sensitive device configured to generate one output signal, whereas, herein, a light-sensitive device configured to generate two or more output signals, for example at least one CCD and/or CMOS device, is referred to as two or more optical sensors. As will further be outlined in detail below, each optical sensor may be embodied such that precisely one light-sensitive area is present in the respective optical sensor, such as by providing precisely one light-sensitive area which may be illuminated, in response to which illumination precisely one uniform sensor signal is created for the whole optical sensor. Thus, each optical sensor may be a single area optical sensor. The use of the single area optical sensors, however, renders the setup of the detector specifically simple and efficient. Thus, as an example, commercially available photo-sensors, such as commercially available silicon photodiodes, each having precisely one sensitive area, may be used in the setup. Other embodiments, however, are feasible. Thus, as an example, an optical device comprising two, three, four or more than four light-sensitive areas may be used which is regarded as two, three, four or more than four optical sensors in the context of the present invention. As outlined above, the sensor element comprises a matrix of optical sensors. Thus, as an example, the optical sensors may be part of or constitute a pixelated optical device. As an example, the optical sensors may be part of or constitute at least one CCD and/or CMOS device having a matrix of pixels, each pixel forming a light-sensitive area.

As outlined above, the optical sensors specifically may be or may comprise photodetectors, preferably inorganic photodetectors, more preferably inorganic semiconductor photodetectors, most preferably silicon photodetectors. Specifically, the optical sensors may be sensitive in the infrared spectral range. All of the optical sensors of the matrix or at least a group of the optical sensors of the matrix specifically may be identical. Groups of identical optical sensors of the matrix specifically may be provided for different spectral ranges, or all optical sensors may be identical in terms of spectral sensitivity. Further, the optical sensors may be identical in size and/or with regard to their electronic or optoelectronic properties.

Specifically, the optical sensors may be or may comprise inorganic photodiodes which are sensitive in the infrared spectral range, preferably in the range of 780 nm to 3.0 micrometers. Specifically, the optical sensors may be sensitive in the part of the near infrared region where silicon photodiodes are applicable specifically in the range of 700 nm to 1000 nm. Infrared optical sensors which may be used for optical sensors may be commercially available infrared optical sensors, such as infrared optical sensors commercially available under the brand name Hertzstueck™ from trinamiX GmbH, D-67056 Ludwigshafen am Rhein, Germany. Thus, as an example, the optical sensors may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensors may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensors may comprise at least one bolometer, preferably a bolometer selected from the group consisting of a VO bolometer and an amorphous Si bolometer.

The matrix may be composed of independent optical sensors. Thus, a matrix may be composed of inorganic photodiodes. Alternatively, however, a commercially available matrix may be used, such as one or more of a CCD detector, such as a CCD detector chip, and/or a CMOS detector, such as a CMOS detector chip.

Thus, generally, the optical sensors of the detector may form a sensor array or may be part of a sensor array, such as the above-mentioned matrix. Thus, as an example, the detector may comprise an array of optical sensors, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that 0.3≤m/n≤3, such as by choosing m/n=1:1, 4:3, 16:9 or similar. As an example, the array may be a square array, having an equal number of rows and columns, such as by choosing m=2, n=2 or m=3, n=3 or the like.

The matrix specifically may be a rectangular matrix having at least one row, preferably a plurality of rows, and a plurality of columns. As an example, the rows and columns may be oriented essentially perpendicular, wherein, with respect to the term "essentially perpendicular", reference may be made to the definition given above. Thus, as an example, tolerances of less than 20°, specifically less than 10° or even less than 5°, may be acceptable. In order to provide a wide range of view, the matrix specifically may have at least 10 rows, preferably at least 50 rows, more preferably at least 100 rows. Similarly, the matrix may have at least 10 columns, preferably at least 50 columns, more preferably at least 100 columns. The matrix may comprise at least 50 optical sensors, preferably at least 100 optical sensors, more preferably at least 500 optical sensors. The matrix may comprise a number of pixels in a multi-mega pixel range. Other embodiments, however, are feasible. Thus, in setups in which an axial rotational symmetry is to be expected, circular arrangements or concentric arrangements of the optical sensors of the matrix, which may also be referred to as pixels, may be preferred.

Preferably, the sensor element may be oriented essentially perpendicular to an optical axis of the detector. Again, with respect to the term "essentially perpendicular", reference may be made to the definition and the tolerances given above. The optical axis may be a straight optical axis or may be bent or even split, such as by using one or more deflection elements and/or by using one or more beam splitters, wherein the essentially perpendicular orientation, in the latter cases, may refer to the local optical axis in the respective branch or beam path of the optical setup.

The reflected light beams may propagate from the object towards the detector. The projector may illuminate the object with the illumination pattern and the light is reflected or scattered by the object and, thereby, is at least partially directed as reflection light beam towards the detector.

Each optical sensor is designed to generate at least one sensor signal in response to an illumination of its respective light-sensitive area by a reflection light beam propagating from the object to the detector. The reflection light beam specifically may fully illuminate the sensor element such that the sensor element is fully located within the light beam with a width of the light beam being larger than the matrix. Contrarily, preferably, the reflection light beam specifically may create a light spot on the entire matrix which is smaller than the matrix, such that the light spot is fully located within the matrix. This situation may easily be adjusted by a person skilled in the art of optics by choosing one or more appropriate lenses or elements having a focusing or defocusing effect on the light beam, such as by using an appropriate transfer device.

As further used herein, a "sensor signal" generally refers to a signal generated by an optical sensor in response to the illumination by the light beam. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the detector, the optical sensor or any other element may be configured for processing or preprocessing the sensor signal, thereby generating secondary sensor signals, which may also be used as sensor signals, such as preprocessing by filtering or the like.

Raw sensor signals of the optical sensors may be used for evaluation or secondary sensor signals derived thereof. As used herein, the term "secondary sensor signal" generally refers to a signal, such as an electronic signal, more preferably an analogue and/or a digital signal, which is obtained by processing one or more raw signals, such as by filtering, averaging, demodulating or the like. Thus, image processing algorithms may be used for generating secondary sensor signals from the totality of sensor signals of the matrix or from a region of interest within the matrix. Specifically, the detector, such as the evaluation device, may be configured for transforming the sensor signals of the optical sensor, thereby generating secondary optical sensor signals, wherein the evaluation device is configured for performing determining of the initial distance information by using the secondary optical sensor signals. The transformation of the sensor signals specifically may comprise at least one transformation selected from the group consisting of: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing an object within an image generated by the optical sensors. As an example, a vehicle, a person or another type of predetermined object may be determined by automatic image recognition within an image, i.e. within the totality of sensor signals generated by the optical sensors, and the region of interest may be chosen such that the object is located within the region of interest. In this case, the evaluation, such as the determination of the longitudinal coordinate, may be performed for the region of interest, only. Other implementations, however, are feasible.

The light-sensitive areas specifically may be oriented towards the object. As used herein, the term "is oriented towards the object" generally refers to the situation that the respective surfaces of the light-sensitive areas are fully or partially visible from the object. Specifically, at least one interconnecting line between at least one point of the object and at least one point of the respective light-sensitive area may form an angle with a surface element of the light-sensitive area which is different from 0°, such as an angle in the range of 20° to 90°, preferably 80 to 90° such as 90°. Thus, when the object is located on the optical axis or close to the optical axis, the light beam propagating from the object towards the detector may be essentially parallel to the optical axis. As used herein, the term "essentially perpendicular" refers to the condition of a perpendicular orientation, with a tolerance of e.g. ±20° or less, preferably a tolerance of ±10° or less, more preferably a tolerance of ±5° or less. Similarly, the term "essentially parallel" refers to the condition of a parallel orientation, with a tolerance of e.g. ±20° or less, preferably a tolerance of ±10° or less, more preferably a tolerance of ±5° or less.

The optical sensors may be sensitive in one or more of the ultraviolet, the visible or the infrared spectral range. Specifically, the optical sensors may be sensitive in the visible spectral range from 500 nm to 780 nm, most preferably at 650 nm to 750 nm or at 690 nm to 700 nm. Specifically, the optical sensors may be sensitive in the near infrared region. Specifically, the optical sensors may be sensitive in the part of the near infrared region where silicon photodiodes are applicable specifically in the range of 700 nm to 1000 nm. The optical sensors, specifically, may be sensitive in the infrared spectral range, specifically in the range of 780 nm to 3.0 micrometers. For example, the optical sensors each, independently, may be or may comprise at least one element selected from the group consisting of a photodiode, a photocell, a photoconductor, a phototransistor or any combination thereof. For example, the optical sensors may be or may comprise at least one element selected from the group consisting of a CCD sensor element, a CMOS sensor element, a photodiode, a photocell, a photoconductor, a phototransistor or any combination thereof. Any other type of photosensitive element may be used. As will be outlined in further detail below, the photosensitive element generally may fully or partially be made of inorganic materials and/or may fully or partially be made of organic materials. Most commonly, as will be outlined in further detail below, one or more photodiodes may be used, such as commercially available photodiodes, e.g. inorganic semiconductor photodiodes.

As used herein, the term "reflection image" refers to an image determined by the optical sensor comprising at least one reflection feature and/or an evaluation of the image of the optical sensor with regard to at least one feature and/or transformation of extrinsic parameters such as rotation and translation. Each of the reflection features comprises a beam profile. As used herein, the term "reflection feature" refers to a feature in an image plane generated by the object in response to illumination, for example with at least one illumination feature. The reflection image may comprise the at least one reflection pattern comprising the at least one reflection feature. As used herein, the term "determining at least one reflection image" refers to one or more of imaging, recording and generating of the reflection image.

The sensor element may be configured for determining at least one reflection pattern. As used herein, the term "reflection pattern" refers to a response pattern generated by reflection or scattering of light at the surface of the object, in particular generated by the object in response to illumination by the illumination pattern. The reflection pattern may comprise at least one feature corresponding to at least one feature of the illumination pattern. The reflection pattern may comprise, in comparison to the illumination pattern, at least one distorted pattern, wherein the distortion depends on the distance of the object, such as surface properties of the object. The evaluation device may be configured for selecting at least one feature of the reflection pattern and to determine the longitudinal region of the selected feature of the reflection pattern by evaluating the combined signal Q from the sensor signals, as described above and in more detail below.

As further used herein, the term "evaluation device" generally refers to an arbitrary device configured for performing the named operations, preferably by using at least one data processing device and, more preferably, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations. The above-mentioned operations, including determining the at least one longitudinal coordinate of the object, are performed by the at least one evaluation device. Thus, as an example, one or more of the relationships, as will be outlined below, may be implemented in software and/or hardware, such as by implementing one or more lookup tables. Thus, as an example, the evaluation device may comprise one or more programmable devices such as one or more computers, application-specific integrated circuits (ASICs), Digital Signal Processors (DSPs), or Field Programmable Gate Arrays (FPGAs) which are configured to perform the above-mentioned evaluation, in order to determine the at least one longitudinal coordinate of the object. Additionally or alternatively, however, the evaluation device may also fully or partially be embodied by hardware.

The evaluation device may be configured for selecting at least one reflection feature of the reflection image. The evaluation device may be configured for selecting successively reflection features of the reflection image. The evaluation device may be configured for performing an image analysis of the reflection image thereby identifying reflections features of the reflection image. As used herein, the term "select at least one reflection feature" refers to one or more of identifying, determining and choosing at least one reflection feature of the reflection image. The evaluation device may be configured for performing at least one image analysis and/or image processing in order to identify the reflection feature. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing an object within an image generated by the optical sensors.

As used herein, the term "initial distance information" may refer to a longitudinal coordinate determined by using the combined signal Q. The detector may be configured for determining the longitudinal coordinate of an object point for at least one reflection feature of the reflection image from the combined signal Q. Thus, the detector may be configured for pre-classifying the at least one reflection feature of the reflection image and/or to provide a distance estimate for the reflection feature. Specifically, the detector may be configured for determining at least one more accurate distance information of the object by using triangulation considering the initial distance information, in particular the pre-classification and/or distance estimate.

The evaluation device is configured for determining at least one initial distance information, i.e. a longitudinal coordinate z of the selected reflection feature of the reflection image, by analysis of their respective beam profiles. This technique is called beam profile analysis or depth-from-photon-ratio technique, and comprises determining a longitudinal coordinate by evaluating a combined signal Q from the sensor signals. Beam profile analysis, in particular the determining of the longitudinal coordinate using the combined signal Q, is generally known to the skilled person such as from WO 2018/091649 A1, WO 2018/091638 A1 and WO 2018/091640 A1, the content of which is included by reference.

The analysis of a beam profile comprises evaluating a combined signal Q from the respective sensor signals, in particular of the sensor signals generated by the optical sensors detecting a reflection light beam on their light-sensitive area. Each optical sensor is designed to generate at least one sensor signal in response to an illumination of its respective light-sensitive area by a reflection light beam propagating from the object to the detector.

As used herein, the term "combined signal Q" refers to a signal which is generated by combining the sensor signals, in particular by one or more of dividing the sensor signals, dividing multiples of the sensor signals or dividing linear combinations of the sensor signals. The evaluation device may be configured for deriving the combined signal Q by one or more of dividing the sensor signals, dividing multiples of the sensor signals, dividing linear combinations of the sensor signals. The evaluation device may be configured for using at least one predetermined relationship between the combined signal Q and the longitudinal region for determining the longitudinal region.

For example, the evaluation device may be configured for deriving the combined signal Q by $$Q(z_O) = \frac{\int\int_{A_1} E(x, y; z_O) dx dy}{\int\int_{A_2} E(x, y; z_O) dx dy},$$

wherein x and y are transversal coordinates, A1 and A2 are different areas of at least one beam profile of the reflection light beam at the sensor position, and $E(x,y,z_o)$ denotes the beam profile given at the object distance $z_o$. Area A1 and area A2 may differ. In particular, A1 and A2 are not congruent. Thus, A1 and A2 may differ in one or more of the shape or content.

Generally the beam profile is dependent on luminance $L(z_o)$ and beam shape $S(x,y; z_o)$, $E(x,y; z_o)=L\cdot S$. Thus, by deriving the combined signal it may allow determining the longitudinal coordinate independent from luminance. In addition, using the combined signal allows determination of the distance $z_o$ independent from the object size. Thus, the combined signal allows determination of the distance $z_o$ independent from the material properties and/or reflective properties and/or scattering properties of the object and independent from alterations of the light source such as by manufacturing precision, heat, water, dirt, damages on the lens, or the like.

Each of the sensor signals may comprise at least one information of at least one area of the beam profile of the light beam. As used herein, the term "area of the beam profile" generally refers to an arbitrary region of the beam profile at the sensor position used for determining the combined signal Q.

The light-sensitive areas may be arranged such that a first sensor signal comprises information of a first area of the beam profile and a second sensor signal comprises information of a second area of the beam profile. The first area of the beam profile and second area of the beam profile may be one or both of adjacent or overlapping regions. The first area of the beam profile and the second area of the beam profile may be not congruent in area.

The evaluation device may be configured to determine and/or to select the first area of the beam profile and the second area of the beam profile. The first area of the beam profile may comprise essentially edge information of the beam profile and the second area of the beam profile may comprise essentially center information of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. As used herein, the term "essentially center information" generally refers to a low proportion of edge information, i.e. proportion of the intensity distribution corresponding to edges, compared to a proportion of the center information, i.e. proportion of the intensity distribution corresponding to the center. Preferably the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A2 and the second area of the beam profile may be area A1.

Other selections of the first area A1 and second area A2 may be feasible. For example, the first area may comprise essentially outer regions of the beam profile and the second area may comprise essentially inner regions of the beam profile. For example, in case of a two-dimensional beam profile, the beam profile may be divided in a left part and a right part, wherein the first area may comprise essentially areas of the left part of the beam profile and the second area may comprise essentially areas of the right part of the beam profile.

The edge information may comprise information relating to a number of photons in the first area of the beam profile and the center information may comprise information relating to a number of photons in the second area of the beam profile. The evaluation device may be configured for determining an area integral of the beam profile. The evaluation device may be configured for determine the edge information by integrating and/or summing of the first area. The evaluation device may be configured for determining the center information by integrating and/or summing of the second area. For example, the beam profile may be a trapezoid beam profile and the evaluation device may be configured for determining an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be configured for determining one or both of center information or edge information from at least one slice or cut of the light spot. This may be realized, for example, by replacing the area integrals in the combined signal Q by a line integral along the slice or cut. For improved accuracy, several slices or cuts through the light spot may be used and averaged. In case of an elliptical spot profile, averaging over several slices or cuts may result in improved distance information.

In one embodiment, the light beam propagating from the object to the detector may illuminate the sensor element with at least one reflection pattern comprising a plurality of feature points. As used herein, the term "feature point" refers to at least one at least partially extended feature of the pattern. The feature point may be selected from the group consisting of: at least one point, at least one line, at least one edge. The reflection pattern may be generated by the object, for example, in response to an illumination by the at least one light source with an illumination pattern comprising the at least one pattern. A1 may correspond to a full or complete area of a feature point on the optical sensors. A2 may be a central area of the feature point on the optical sensors. The central area may be a constant value. The central area may be smaller compared to the full area of the feature point. For example, in case of a circular feature point, the central area may have a radius from 0.1 to 0.9 of a full radius of the feature point, preferably from 0.4 to 0.6 of the full radius.

The evaluation device may be configured to derive the combined signal Q by one or more of dividing the edge information and the center information, dividing multiples of the edge information and the center information, dividing linear combinations of the edge information and the center information. Thus, essentially, photon ratios may be used as the physical basis of the technique.

For example, the evaluation device may be configured for evaluating the sensor signals, by determining at least one optical sensor having the highest sensor signal and forming at least one center signal;

evaluating the sensor signals of the optical sensors of the matrix and forming at least one sum signal;

determining at least one combined signal by combining the center signal and the sum signal; and determining the at least one longitudinal coordinate z of the selected feature by evaluating the combined signal.

Consequently, in accordance with the present invention, the term "center signal" generally refers to the at least one sensor signal comprising essentially center information of the beam profile. For example, the center signal may be the signal of the at least one optical sensor having the highest sensor signal out of the plurality of sensor signals generated by the optical sensors of the entire matrix or of a region of interest within the matrix, wherein the region of interest may be predetermined or determinable within an image generated by the optical sensors of the matrix. As used herein, the term "highest sensor signal" refers to one or both of a local maximum or a maximum in a region of interest. The center signal may arise from a single optical sensor or, as will be outlined in further detail below, from a group of optical sensors, wherein, in the latter case, as an example, the sensor signals of the group of optical sensors may be added up, integrated or averaged, in order to determine the center signal. The group of optical sensors from which the center signal arises may be a group of neighboring optical sensors, such as optical sensors having less than a predetermined distance from the actual optical sensor having the highest sensor signal, or may be a group of optical sensors generating sensor signals being within a predetermined range from the highest sensor signal. The group of optical sensors from which the center signal arises may be chosen as large as possible in order to allow maximum dynamic range. The evaluation device may be configured for determining the center signal by integration of the plurality of sensor signals, for example the plurality of optical sensors around the optical sensor having the highest sensor signal. For example, the beam profile may be a trapezoid beam profile and the evaluation device may be configured for determining an integral of the trapezoid, in particular of a plateau of the trapezoid.

As outlined above, the center signal generally may be a single sensor signal, such as a sensor signal from the optical sensor in the center of the light spot, or may be a combination of a plurality of sensor signals, such as a combination of sensor signals arising from optical sensors in the center of the light spot, or a secondary sensor signal derived by processing a sensor signal derived by one or more of the aforementioned possibilities. The determination of the center signal may be performed electronically, since a comparison of sensor signals is fairly simply implemented by conventional electronics, or may be performed fully or partially by software. Specifically, the center signal may be selected from the group consisting of: the highest sensor signal; an average of a group of sensor signals being within a predetermined range of tolerance from the highest sensor signal; an average of sensor signals from a group of optical sensors containing the optical sensor having the highest sensor signal and a predetermined group of neighboring optical sensors; a sum of sensor signals from a group of optical sensors containing the optical sensor having the highest sensor signal and a predetermined group of neighboring optical sensors; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring optical sensors; an integral of a group of sensor signals being within a predetermined range of tolerance from the highest sensor signal; an integral of a group of sensor signals being above a predetermined threshold.

Similarly, the term "sum signal" generally refers to a signal comprising essentially edge information of the beam profile. For example, the sum signal may be derived by adding up the sensor signals, integrating over the sensor signals or averaging over the sensor signals of the entire matrix or of a region of interest within the matrix, wherein the region of interest may be predetermined or determinable within an image generated by the optical sensors of the matrix. When adding up, integrating over or averaging over the sensor signals, the actual optical sensors from which the sensor signal is generated may be left out of the adding, integration or averaging or, alternatively, may be included into the adding, integration or averaging. The evaluation device may be configured for determining the sum signal by integrating signals of the entire matrix, or of the region of interest within the matrix. For example, the beam profile may be a trapezoid beam profile and the evaluation device may be configured for determining an integral of the entire trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Similarly, the center signal and edge signal may also be determined by using segments of the beam profile such as circular segments of the beam profile. For example, the beam profile may be divided into two segments by a secant or a chord that does not pass the center of the beam profile. Thus, one segment will essentially contain edge information, while the other segment will contain essentially center information. For example, to further reduce the amount of edge information in the center signal, the edge signal may further be subtracted from the center signal.

Additionally or alternatively, the evaluation device may be configured for determining one or both of center information or edge information from at least one slice or cut of the light spot. This may be realized for example by replacing the area integrals in the combined signal Q by a line integral along the slice or cut. For improved accuracy, several slices or cuts through the light spot may be used and averaged. In case of an elliptical spot profile, averaging over several slices or cuts may result in an improved distance information.

The combined signal may be a signal which is generated by combining the center signal and the sum signal. Specifically, the combination may include one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Additionally or alternatively, the combined signal may comprise an arbitrary signal or signal combination which contains at least one item of information on a comparison between the center signal and the sum signal.

The detection of the center of the light spot, i.e. the detection of the center signal and/or of the at least one optical sensor from which the center signal arises, may be performed fully or partially electronically or fully or partially by using one or more software algorithms. Specifically, the evaluation device may comprise at least one center detector for detecting the at least one highest sensor signal and/or for forming the center signal. The center detector specifically may fully or partially be embodied in software and/or may fully or partially be embodied in hardware. The center detector may fully or partially be integrated into the at least one sensor element and/or may fully or partially be embodied independently from the sensor element.

Te sum signal may be derived from all sensor signals of the matrix, from the sensor signals within a region of interest or from one of these possibilities with the sensor signals arising from the optical sensors contributing to the center signal excluded. In every case, a reliable sum signal may be generated which may be compared with the center signal reliably, in order to determine the longitudinal coordinate. Generally, the sum signal may be selected from the group consisting of: an average over all sensor signals of the matrix; a sum of all sensor signals of the matrix; an integral of all sensor signals of the matrix; an average over all sensor signals of the matrix except for sensor signals from those optical sensors contributing to the center signal; a sum of all sensor signals of the matrix except for sensor signals from those optical sensors contributing to the center signal; an integral of all sensor signals of the matrix except for sensor signals from those optical sensors contributing to the center signal; a sum of sensor signals of optical sensors within a predetermined range from the optical sensor having the highest sensor signal; an integral of sensor signals of optical sensors within a predetermined range from the optical sensor having the highest sensor signal; a sum of sensor signals above a certain threshold of optical sensors being located within a predetermined range from the optical sensor having the highest sensor signal; an integral of sensor signals above a certain threshold of optical sensors being located within a predetermined range from the optical sensor having the highest sensor signal. Other options, however, exist.

The summing may be performed fully or partially in software and/or may be performed fully or partially in hardware. A summing is generally possible by purely electronic means which, typically, may easily be implemented into the detector. Thus, in the art of electronics, summing devices are generally known for summing two or more electrical signals, both analogue signals and digital signals. Thus, the evaluation device may comprise at least one summing device for forming the sum signal. The summing device may fully or partially be integrated into the sensor element or may fully or partially be embodied independently from the sensor element. The summing device may fully or partially be embodied in one or both of hardware or software.

The comparison between the center signal and the sum signal specifically may be performed by forming one or more quotient signals. Thus, generally, the combined signal Q may be a quotient signal, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; forming a quotient of the center signal and a linear combination of the sum signal and the center signal or vice versa; forming a quotient of the sum signal and a linear combination of the sum signal and the center signal or vice versa; forming a quotient of an exponentiation of the center signal and an exponentiation of the sum signal or vice versa. Other options, however, exist. The evaluation device may be configured for forming the one or more quotient signals. The evaluation device may further be configured for determining the at least one longitudinal coordinate by evaluating the at least one quotient signal.

The evaluation device is configured for using at least one predetermined relationship between the combined signal Q and the longitudinal coordinate for determining the initial distance information, in particular by using at least one known, determinable or predetermined relationship between the sensor signals. In particular, the evaluation device is configured to determine the at least one coordinate of the object by using at least one known, determinable or predetermined relationship between a quotient signal derived from the sensor signals and the longitudinal coordinate. The predetermined relationship may be one or more of an empiric relationship, a semi-empiric relationship and an analytically derived relationship. The evaluation device may comprise at least one data storage device for storing the predetermined relationship, such as a lookup list or a lookup table.

Thus, due to the reasons disclosed above and due to the dependency of the properties of the light spot on the longitudinal coordinate, the combined signal Q typically is a monotonous function of the longitudinal coordinate of the object and/or of the size of the light spot such as the diameter or equivalent diameter of the light spot. Thus, as an example, specifically in case linear optical sensors are used, a simple quotient of the sensor signal $s_{center}$ and the sum signal $s_{sum}$ $Q=s_{center}/s_{sum}$ may be a monotonously decreasing function of the distance. Without wishing to be bound by this theory, it is believed that this is due to the fact that, in the preferred setup described above, both the center signal $s_{center}$ and the sum signal s awn decrease as a square function with increasing distance to the light source, since the amount of light reaching the detector decreases. Therein, however, the center signal $s_{center}$ decreases more rapidly than the sum signal $s_{sum}$, since, in the optical setup as used in the experiments, the light spot in the image plane grows and, thus, is spread over a larger area. The quotient of the center signal and the sum signal, thus, continuously decreases with increasing diameter of the light beam or diameter of the light spot on the light-sensitive areas of the optical sensors of the matrix. The quotient, further, is typically independent from the total power of the light beam, since the total power of the light beam forms a factor both in the center signal and in the sum sensor signal. Consequently, the combined signal Q may form a secondary signal which provides a unique and unambiguous relationship between the center signal and the sum signal and the size or diameter of the light beam. Since, on the other hand, the size or diameter of the light beam is dependent on a distance between the object, from which the light beam propagates towards the detector, and the detector itself, i.e. dependent on the longitudinal coordinate of the object, a unique and unambiguous relationship between the center signal and the sum signal on the one hand and the longitudinal coordinate on the other hand may exist. The predetermined relationship may be determined by analytical considerations, such as by assuming a linear combination of Gaussian light beams, by empirical measurements, such as measurements measuring the combined signal and/or the center signal and the sum signal or secondary signals derived thereof as a function of the longitudinal coordinate of the object, or both.

The combined signal Q may be determined by using various means. As an example, a software means for deriving the quotient signal, a hardware means for deriving the quotient signal, or both, may be used and may be implemented in the evaluation device. Thus, the evaluation device, as an example, may comprise at least one divider, wherein the divider is configured for deriving the quotient signal. The divider may fully or partially be embodied as one or both of a software divider or a hardware divider. The divider may fully or partially be integrated into the sensor element answers or may fully or partially be embodied independent from the sensor element.

Depth measurements using beam profile analysis may allow reliable distance determination even in case of environment causing multiple reflections, with biasing light sources, or reflective measurement objects with reduced computational demand, in particular with reduced processing power. The beam profile analysis may allow estimating a depth map from the image of the sensor element. Specifically, the distance determined with beam profile analysis may provide a distance estimation per illumination feature and can be refined by triangulation methods for known, and in particular fixed, positions of sensor element and projector. In order to calculate a refined longitudinal coordinate using triangulation, the so-called correspondence problem needs to be solved. Generally, three dimensional reconstruction methods using triangulation require an extrinsic calibrated system. In case of an extrinsic calibrated system, each reflection feature can be matched to a reference grid point, i.e. a reference feature, with the estimated initial distance information of beam profile analysis. Therefore, each detected reflection feature can be matched to the corresponding reference grid point if the epipolar condition is fulfilled and the beam profile analysis yields a reliable depth estimation. However, the distance measurement based on triangulation would become very poorly if the correspondences are determined false. Depending on the hardware, pre-calibrated detectors may be degenerated by physical stress or temperature shifts, such that relative position and rotation changes in time. Changes in relative position of sensor element and projector would result to changes in the reflection image and erroneous determined correspondences of reference features and reflection features and thus, false distance measurement results. The present invention proposes performing a calibration method, in particular a recalibration, for determining extrinsic parameters of the detector. The calibration method according to the present invention may allow directly correcting false distance measurement values on the fly without starting a new static calibration process. In particular, the calibration method may be performed automatically such as without any user interaction. The term "automatically" as used herein is a broad term and is to be given its ordinary and customary meaning to a person of ordinary skill in the art and is not to be limited to a special or customized meaning. The term specifically may refer, without limitation, to a process which is performed completely by means of at least one computer and/or computer network and/or machine, in particular without manual action and/or interaction with a user.

As used herein, the term "calibration" is a broad term and is to be given its ordinary and customary meaning to a person of ordinary skill in the art and is not to be limited to a special or customized meaning. The term calibration may refer to at least one process for determining at least one extrinsic parameter of the detector and/or determining a correction for measurement values of the detector, in particular of the position of the reflection features in the reflection image. The evaluation device may be configured for determining at least one extrinsic parameter of the detector. The extrinsic parameter may comprise at least one parameter selected from the group consisting of: rotation angles between the projector and coordinates of the sensor element, translation components between the projector and coordinates of the sensor element, aperture angles, center of the sensor element, apertures, focal distance.

The calibration method comprises matching the reflection features to reference features of the reference image considering the initial distance information thereby determining pairs of matched reflection and reference features.

As used herein, the term "reference image" refers to an image different from the reflection image which is determined at a different spatial position compared to the reflection image. The reference image may be determined by one or more of recording at least one reference feature, imaging the at least one reference feature, calculating of the reference image. Specifically, the reference image comprises at least one reference pattern, also denoted as reference grid, comprising a plurality of reference features. As used herein, the term "reference feature" refers to at least one feature of the reference image. The reference image and the reflection image may be images of the object determined at different spatial positions having a fixed distance. The distance may be a relative distance, also called baseline.

For example, the reference image may be a reference grid such as an image of the illumination pattern at an image plane at a position of the projector. The projector and the sensor element may be separated by a fixed distance.

For example, the detector may comprise at least two sensor elements each having a matrix of optical sensors. At least one first sensor element and at least one second sensor element may be positioned at different spatial positions. A relative distance between the first sensor element and the second element may be fixed. The at least one first sensor element may be configured for determining at least one first reflection pattern, in particular at least one first reflection feature, and the at least one second sensor element may be configured for determining at least one second reflection pattern, in particular at least one second reflection feature. The evaluation device may be configured for selecting at least one image determined by the first sensor element or the second sensor element as reflection image and for selecting at least one image determined by the other one of the first sensor element or the second sensor element as reference image.

The evaluation device may be configured for matching respectively one of the reflection features with respectively one of the reference features within the displacement region by using at least one linear scaling algorithm. The beam profile analysis may allow reducing the number of possibilities.

The evaluation device may be configured for determining the at least one reference feature in the at least one reference image corresponding to the at least one reflection feature. The evaluation device may be configured for performing an image analysis and for identifying features of the reflection image. The evaluation device may be configured for identifying at least one reference feature in the reference image having an essentially identical longitudinal coordinate as the selected reflection feature. The term "essentially identical" refers to identical within 10%, preferably 5%, most preferably 1%. The reference feature corresponding to the reflection feature may be determined using epipolar geometry. For description of epipolar geometry reference is made, for example, to chapter 2 in X. Jiang, H. Bunke: "Dreidimensionales Computersehen", Springer, Berlin Heidelberg, 1997. Epipolar geometry may assume that the reference image and the reflection image may be images of the object determined at different spatial positions and/or spatial orientations having a fixed distance. The reference image and the reflection image may be images of the object determined at different spatial positions having a fixed distance. The evaluation device may be configured for determining an epipolar line in the reference image. An assumed relative position of the reference image and reflection image may be known. For example, an assumed relative position of the reference image may be determined in a preceding or historic calibration, in which steps a) to e) have been performed. For example, an assumed relative position of the reference image and reflection image may be a manufacturer value. For example, an assumed relative position of the reference image and reflection image may be stored within at least one storage unit of the evaluation device. The evaluation device may be configured for determining a straight line extending from a selected reflection feature of the reflection image. The straight line may comprise possible reflection features corresponding to the selected reflection feature. The straight line and the baseline span an epipolar plane. As the reference image is determined at a different relative position from the reflection image, the corresponding possible reflection features may be imaged on a straight line, called epipolar line, in the reference image. Thus, a reference feature of the reference image corresponding to the selected reflection feature of the reflection image are assumed to lie on the epipolar line. However, as outlined above, due to distortions of the image or changes in the extrinsic parameters such as due to ageing, temperature changes, mechanical stress or the like, epipolar lines may intersect or be very close to each other and/or the correspondence between reference feature and reflection feature may be unclear.

The evaluation device may be configured for determining, for each reflection feature, a longitudinal region of the reflection feature. The longitudinal region may be given by the initial distance information of the reflection feature determined from the combined signal Q and an error interval ±ε. The evaluation device may be configured for determining at least one displacement region in the reference image corresponding to the longitudinal region. As used herein, the term "displacement region" refers to a region in the reference image in which the reference feature corresponding to the selected reflection feature may be imaged. Specifically, the displacement region may be a region in the reference image in which the reference feature corresponding to the selected reflection feature is expected to be located in the reference image. Depending on the distance to the object, an image position of the reference feature corresponding to the reflection feature may be displaced within the reference image compared to an image position of the reflection feature in the reflection image. The displacement region may comprise only one reference feature. The displacement region may also comprise more than one reference feature.

The displacement region may comprise an epipolar line or a section of an epipolar line. The displacement region may comprise more than one epipolar line or more sections of more than one epipolar line. The displacement region may extend along the epipolar line, orthogonal to an epipolar line, or both. The evaluation device may be configured for determining the reference feature along the epipolar line corresponding to the initial distance information and to determine an extent of the displacement region along the epipolar line corresponding to the error interval ±ε or orthogonal to an epipolar line. The measurement uncertainty of the distance measurement using the combined signal Q may result in a displacement region which is non-circular since the measurement uncertainty may be different for different directions. Specifically, the measurement uncertainty along the epipolar line or epipolar lines may be greater than the measurement uncertainty in an orthogonal direction with respect to the epipolar line or epipolar lines. The displacement region may comprise an extent in an orthogonal direction with respect to the epipolar line or epipolar lines. The evaluation device may be configured for matching a selected reflection feature with at least one reference feature within the displacement region. As used herein, the term "matching" refers to determining and/or evaluating corresponding reference and reflection features. The evaluation device may be configured for matching the selected feature of the reflection image with the reference feature within the displacement region by using at least one evaluation algorithm considering the determined initial distance information. The evaluation algorithm may be a linear scaling algorithm. The evaluation device may be configured for determining the epipolar line closest to and/or within the displacement region. The evaluation device may be configured for determining the epipolar line closest to the image position of the reflection feature. The extent of the displacement region along the epipolar line may be larger than the extent of the displacement region orthogonal to the epipolar line. The evaluation device may be configured for determining an epipolar line before determining a corresponding reference feature. The evaluation device may determine a displacement region around the image position of each reflection feature. The evaluation device may be configured for assigning an epipolar line to each displacement region of each image position of the reflection features, such as by assigning the epipolar line closest to a displacement region and/or within a displacement region and/or closest to a displacement region along a direction orthogonal to the epipolar line. The evaluation device may be configured for determining the reference feature corresponding to the image position of the reflection feature by determining the reference feature closest to the assigned displacement region and/or within the assigned displacement region and/or closest to the assigned displacement region along the assigned epipolar line and/or within the assigned displacement region along the assigned epipolar line.

Additionally or alternatively, the evaluation device may be configured to perform the following steps:
  Determining the displacement region for the image position of each reflection feature;
  Assigning an epipolar line to the displacement region of each reflection feature such as by assigning the epipolar line closest to a displacement region and/or within a displacement region and/or closest to a displacement region along a direction orthogonal to the epipolar line;
  Assigning and/or determining at least one reference feature to each reflection feature such as by assigning the reference feature closest to the assigned displacement region and/or within the assigned displacement region and/or closest to the assigned displacement region along the assigned epipolar line and/or within the assigned displacement region along the assigned epipolar line.

Additionally or alternatively, the evaluation device may be configured for deciding between more than one epipolar line and/or reference feature to be assigned to a reflection feature such as by comparing distances of reflection features and/or epipolar lines within the reference image and/or by comparing error weighted distances, such as ε-weighted distances of reflection features and/or epipolar lines within the reference image and assigning the epipolar line and/or reference feature in shorter distance and/or ε-weighted distance to the reference feature and/or reflection feature.

The detector, in particular the evaluation device, may be configured for pre-classifying the selected reflection feature using the combined signal Q such that an unambiguous assignment to one reference feature is possible. In particular, illumination features of the illumination pattern may be arranged such that corresponding reference features of the reference image may have a relative distance to each other as large as possible on the epipolar line. The illumination features of the illumination pattern may be arranged such that only few reference features are positioned on the epipolar line.

Using the beam profile analysis may allow estimating the initial distance information, such as a longitudinal coordinate within the error interval. By determining the displacement region corresponding to the initial distance information and the corresponding error interval may allow reducing the possible number of solutions along the epipolar line for matching reference and reflection features significantly. The number of possible solutions may even be reduced to one. Determining of the initial distance information may be performed during a pre-evaluation before matching the reflection features and reference features. This may allow reducing the computational demand such that it is possible to significantly reduce costs and to allow a use in mobile device or outdoor devices.

The calibration method comprises determining an epipolar line of the matched reference feature in the reference image for each of the pairs of matched reflection and reference features. In particular, the epipolar line used for matching the respectively matched reference and reflection feature may be used as epipolar line of said pair of matched reflection and reference features.

The calibration method further comprises determining an epipolar line distance d of the matched reflection feature to said epipolar line. As used herein, the term "epipolar line distance" may refer to a distance of the reflection feature and the epipolar line used for matching with the matched reference feature, denoted as corresponding epipolar line. The distance may be determined by determining image coordinates of the reflection image and of the corresponding epipolar line and comparing the image coordinates. A minimum distance to the corresponding epipolar line may be used as epipolar line distance. In case of a good extrinsic calibration the epipolar line distance is close to zero. This is just the epipolar condition. In case the detector is decalibrated, the reflection features may to match probably to the reference features. However, it may always possible to determine the epipolarline distance to a false or true corresponding reference feature. In the matching step, a used reconstruction algorithm may match reflection features to reference features if the epipolarline distance is in the tolerance range. Therefore, it may be possible, that the reflection feature is matched to a false reference feature, resulting in a non-zero epipolar line distance. The evaluation device may be configured for performing steps b) to e) even if also false pairs of matched reflection and reference features are determined. The calibration method may be based on evaluating the resulting epipolar line distances. The calibration method may consider epipolar distances independent from the fact if the correspondence between reflection and reference feature is correct or false. The epipolar distance may be suitable for the proposed calibration strategy even if the reflection features are matched to the wrong reference features.

Step d) comprises evaluating the epipolar line distances d as a function of an image position (x,y) in the reference image thereby determining a geometric pattern. As used herein, the term "geometric pattern" may refer to a distribution of epipolar line distances. The epipolarline distances may be defined as a function d(x,y) on the position (x,y) of the reference image. The epipolarline distance function d can be analyzed to compute the correction for rotation and/or translation. In case of a decalibrated system, the function d may generate a geometric pattern. The shape of this geometric pattern of the epipolarline distance function may show uniquely the degree of decalibration. The geometric pattern like repetitions, steepness, discontinuities, and curvatures in the function d(x,y) can be used to recover the calibration. If the rotation and/or translation of the projector and/or sensor element changes, this result can be observed in the function d as geometric pattern. The evaluation device may be configured for performing an algorithm designed for analyzing d(x,y) and for computing a correction for the rotation and/or translation. The evaluation device may be configured for determining the correction of the reflection image by evaluating one or more of shape, repetitions, steepness, discontinuities, and curvatures of the geometric pattern.

The evaluation device may be configured for correcting the reflection image based on the determined correction. As outlined above, the reflection image refers to an evaluation of the image of the optical sensor with regard to at least one feature and/or transformation of extrinsic parameters such as rotation and translation. The correction for rotation and/or translation of the reflection image may be at least one correction factor applied to the image positions of the reflection image. The evaluation device may be configured for determining if the geometric pattern agrees within pre-defined tolerances to a geometric pattern of a calibrated detector or if the geometric pattern deviates from the geometric pattern of a calibration by more than pre-defined tolerances. The determined correction may give information about the degree of decalibration. If the detector is already optimally calibrated, then the correction step may be very small and the correction may have a very small effect, too. In case of agreement within tolerances, the evaluation device may maintain initial extrinsic parameters and/or correction of the reflection image may be discarded. Otherwise the correction may be applied to the reflection image. The determined correction may be used for correcting rotation and/or translation. Rotation and translation describe a spatial context between the sensor element and the projector. Rotation and translation may comprise the relation between "reflection features" to "reference features". From this relation the triangulation distance information can be calculated by using triangulation techniques. Thus, in case of determined changes in rotation and/or translation, the resulting triangulation information may be corrected.

The evaluation device may be configured for determining at least one triangulation distance information of the reflection feature by using triangulation considering the determined correction. As used herein, the term "triangulation distance" may refer to a longitudinal coordinate determined by using triangulation. The evaluation device may be configured for determining a displacement of a matched reference feature and reflection feature. As used herein, the term "displacement" refers to a difference between a position in the reference image to a position in the reflection image. The evaluation device may be configured for determining the triangulation distance of the matched reference feature using a predetermined relationship between a longitudinal coordinate and the displacement. The evaluation device is configured for performing the calibration method on the fly during determining the triangulation distance information.

As outlined above, the detector may be configured for determining the at least one longitudinal coordinate of the object, including the option of determining the longitudinal coordinate of the whole object or of one or more parts thereof. In addition, however, other coordinates of the object, including one or more transversal coordinates and/or rotational coordinates, may be determined by the detector, specifically by the evaluation device. Thus, as an example, one or more transversal sensors may be used for determining at least one transversal coordinate of the object. Various transversal sensors are generally known in the art, such as the transversal sensors disclosed in WO 2014/097181 A1 and/or other position-sensitive devices (PSDs), such as quadrant diodes, CCD or CMOS chips or the like. Additionally or alternatively, as an example, the detector according to the present invention may comprise one or more PSDs disclosed in R. A. Street (Ed.): *Technology and Applications of Amorphous Silicon*, Springer-Verlag Heidelberg, 2010, pp. 346-349. Other embodiments are feasible. These devices may generally also be implemented into the detector according to the present invention. As an example, a part of the light beam may be split off within the detector, by at least one beam splitting element. The split-off portion, as an example, may be guided towards a transversal sensor, such as a CCD or CMOS chip or a camera sensor, and a transversal position of a light spot generated by the split-off portion on the transversal sensor may be determined, thereby determining at least one transversal coordinate of the object. Consequently, the detector according to the present invention may either be a one-dimensional detector, such as a simple distance measurement device, or may be embodied as a two-dimensional detector or even as a three-dimensional detector. Further, as outlined above or as outlined in further detail below, by scanning a scenery or an environment in a one-dimensional fashion, a three-dimensional image may also be created. Consequently, the detector according to the present invention specifically may be one of a one-dimensional detector, a two-dimensional detector or a three-dimensional detector. The evaluation device may further be configured to determine at least one transversal coordinate x, y of the object. The evaluation device may be configured for combining the information of the longitudinal coordinate and the transversal coordinate and to determine a position of the object in space.

In a further aspect, the present invention discloses a method for calibrating at least one detector according to the present invention, such as according to one or more of the embodiments referring to a detector as disclosed above or as disclosed in further detail below. The method comprises the following method steps, wherein the method steps may be performed in the given order or may be performed in a different order. Further, one or more additional method steps may be present which are not listed. Further, one, more than one or even all of the method steps may be performed repeatedly.

The method comprises the following steps:
i) determining initial distance information by
    illuminating the object with at least one illumination pattern generated by the at least one projector of the detector, wherein the illumination pattern comprises a plurality of illumination features;
    generating for each reflection light beam impinging on the light-sensitive areas of the optical sensors of the sensor element having a matrix of optical sensors at least one sensor signal in response to an illumination;
    determining at least one reflection image by using the sensor element comprising a plurality of reflection features, wherein each of the reflection features comprises a beam profile;
    by using at least one evaluation device, evaluating the sensor signals thereby determining a combined signal Q and determining the initial distance information of the reflection features by analysis of their respective beam profiles, wherein the analysis of a beam profile comprises evaluating a combined signal Q from the respective sensor signals,
ii) matching the reflection features to reference features of a reference image considering the initial distance information thereby determining pairs of matched reflection and reference features;
iii) determining an epipolar line of the matched reference feature in the reference image for each of the pairs of matched reflection and reference features;
iv) determining an epipolar line distanced of the matched reflection feature to said epipolar line;
v) evaluating the epipolar line distances d as a function of an image position (x,y) in the reference image thereby determining a geometric pattern;
vi) determining at least one correction for rotation and/or translation of the reflection image depending on the geometric pattern.

The method may comprise correcting the reflection image based on the determined correction. The method may further comprise determining at least one triangulation distance information of the reflection feature by using triangulation considering the determined correction.

For details, options and definitions, reference may be made to the detector as discussed above. Thus, specifically, as outlined above, the method may comprise using the detector according to the present invention, such as according to one or more of the embodiments given above or given in further detail below.

In a further aspect of the present invention, use of the detector according to the present invention, such as according to one or more of the embodiments given above or given in further detail below, is proposed, for a purpose of use, selected from the group consisting of: a position measurement in traffic technology; an entertainment application; a security application; a surveillance application; a safety application; a human-machine interface application; a tracking application; a photography application; an imaging application or camera application; a mapping application for generating maps of at least one space; a homing or tracking beacon detector for vehicles; an outdoor application; a mobile application; a communication application; a machine vision application; a robotics application; a quality control application; a manufacturing application. With respect to further uses of the detector and devices of the present invention reference is made to WO 2018/091649 A1, WO 2018/091638 A1 and WO 2018/091640 A1, the content of which is included by reference.

In a further aspect a computer program is proposed for causing a computer or a computer network to fully or partially perform the method for calibrating at least one detector according to the present invention, when executed on the computer or the computer network, wherein the computer program is configured for performing and/or executing at least steps i) to vi) of the method for calibrating at least one detector according to the present invention. Similarly, a computer-readable storage medium is disclosed, comprising instructions which, when the program is executed by computer or computer network, cause the computer or computer network to perform the method according to the present invention, such as according to any one of the embodiments disclosed above and/or any one of the embodiments disclosed in further detail below. As used herein, the term "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

Thus, specifically, one, more than one or even all of method steps may be performed by using a computer or a computer network, preferably by using a computer program.

Further disclosed and proposed herein is a computer program product having program code means, in order to perform the method according to the present invention in one or more of the embodiments enclosed herein when the program is executed on a computer or computer network. Specifically, the program code means may be stored on a computer-readable data carrier and/or on a computer-readable storage medium.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a non-transient computer-readable medium including instructions that, when executed by one or more processors, cause the one or more processors to perform the method according to one or more of the embodiments disclosed herein.

Further disclosed and proposed herein is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier and/or on a computer-readable storage medium. Specifically, the computer program product may be distributed over a data network.

Further, disclosed and proposed herein is a modulated data signal which contains instructions readable by a computer system or computer network, for performing the method according to one or more of the embodiments disclosed herein.

Specifically, further disclosed herein are:
a computer or computer network comprising at least one processor, wherein the processor is adapted to perform the method according to one of the embodiments described in this description,
a computer loadable data structure that is adapted to perform the method according to one of the embodiments described in this description while the data structure is being executed on a computer,
a computer program, wherein the computer program is adapted to perform the method according to one of the embodiments described in this description while the program is being executed on a computer,
a computer program comprising program means for performing the method according to one of the embodiments described in this description while the computer program is being executed on a computer or on a computer network,
a computer program comprising program means according to the preceding embodiment, wherein the program means are stored on a storage medium readable to a computer,
a storage medium, wherein a data structure is stored on the storage medium and wherein the data structure is adapted to perform the method according to one of the embodiments described in this description after having been loaded into a main and/or working storage of a computer or of a computer network, and
a computer program product having program code means, wherein the program code means can be stored or are stored on a storage medium, for performing the method according to one of the embodiments described in this description, if the program code means are executed on a computer or on a computer network.

As used herein, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically are used only once when introducing the respective feature or element. In most cases, when referring to the respective feature or element, the expressions "at least one" or "one or more" are not repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person recognizes, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

Overall, in the context of the present invention, the following embodiments are regarded as preferred:

Embodiment 1 A detector for determining a position of at least one object, the detector comprising:
at least one projector for illuminating the object with at least one illumination pattern, wherein the illumination pattern comprises a plurality of illumination features;
at least one sensor element having a matrix of optical sensors, the optical sensors each having a light-sensitive area, wherein each optical sensor is designed to generate at least one sensor signal in response to an illumination of its respective light-sensitive area by a reflection light beam propagating from the object to the detector, wherein the sensor element is configured to determine at least one reflection image comprising a plurality of reflection features, wherein each of the reflection features comprises a beam profile;

at least one evaluation device configured for determining initial distance information of the reflection features by analysis of their respective beam profiles, wherein the analysis of a beam profile comprises evaluating a combined signal Q from the respective sensor signals, wherein the evaluation device is configured for performing a calibration method comprising:
  a) matching the reflection features to reference features of a reference image considering the initial distance information thereby determining pairs of matched reflection and reference features;
  b) determining an epipolar line of the matched reference feature in the reference image for each of the pairs of matched reflection and reference features;
  c) determining an epipolar line distanced of the matched reflection feature to said epipolar line;
  d) evaluating the epipolar line distances d as a function of an image position (x,y) in the reference image thereby determining a geometric pattern;
  e) determining at least one correction for rotation and/or translation of the reflection image depending on the geometric pattern.

Embodiment 2 The detector according to the preceding embodiment, wherein the evaluation device is configured for correcting the reflection image based on the determined correction.

Embodiment 3 The detector according to any one of the preceding embodiments, wherein the evaluation device is configured for determining at least one triangulation distance information of the reflection feature by using triangulation considering the determined correction.

Embodiment 4 The detector according to the preceding embodiments, wherein the evaluation device is configured for performing the calibration method on the fly during determining the triangulation distance information.

Embodiment 5 The detector according to the preceding embodiments, wherein the evaluation device is configured for determining at least one extrinsic parameter of the detector, wherein the extrinsic parameter comprise at least one parameter selected from the group consisting of: rotation angles between the projector and coordinates of the sensor element, translation components between the projector and coordinates of the sensor element, aperture angles, center of the sensor element, apertures, focal distance.

Embodiment 6 The detector according to the preceding embodiments, wherein the evaluation device is configured for performing steps b) to e) even if also false pairs of matched reflection and reference features are determined.

Embodiment 7 The detector according to the preceding embodiments, wherein the evaluation device is configured for determining the correction of the reflection image by evaluating one or more of shape, repetitions, steepness, discontinuities, and curvatures of the geometric pattern.

Embodiment 8 The detector according to the preceding embodiments, wherein the illumination pattern comprises at least one periodic regular pattern selected from the group consisting of: at least one periodic regular point pattern; at least one hexagonal pattern; at least one rectangular pattern.

Embodiment 9 The detector according to any one of the preceding embodiments, wherein the evaluation device is configured for deriving the combined signal Q by one or more of dividing the sensor signals, dividing multiples of the sensor signals, dividing linear combinations of the sensor signals, wherein the evaluation device is configured for using at least one predetermined relationship between the combined signal Q and the longitudinal coordinate for determining the initial distance information.

Embodiment 10 The detector according to any one of the preceding embodiments, wherein the evaluation device is configured for performing an image analysis of the reflection image thereby identifying reflections features of the reflection image.

Embodiment 11 The detector according to any one of the preceding embodiments, wherein the evaluation device is configured for determining, for each reflection feature, a longitudinal region of the reflection feature, wherein the longitudinal region is given by the initial distance information of the reflection feature determined from the combined signal Q and an error interval ±ε, wherein the evaluation device is configured for determining at least one displacement region in the reference image corresponding to the longitudinal region.

Embodiment 12 The detector according to the preceding embodiment, wherein the evaluation device is configured for matching respectively one of the reflection features with respectively one of the reference features within the displacement region by using at least one linear scaling algorithm.

Embodiment 13 A method for calibrating at least one detector according to any one of the preceding embodiments, the method comprising the following steps:
  vii) determining initial distance information by
    Illuminating the object with at least one illumination pattern generated by the at least one projector of the detector, wherein the illumination pattern comprises a plurality of illumination features;
    generating for each reflection light beam impinging on the light-sensitive areas of the optical sensors of the sensor element having a matrix of optical sensors at least one sensor signal in response to an illumination;
    determining at least one reflection image by using the sensor element comprising a plurality of reflection features, wherein each of the reflection features comprises a beam profile;
    by using at least one evaluation device, evaluating the sensor signals thereby determining a combined signal Q and determining the initial distance information of the reflection features by analysis of their respective beam profiles, wherein the analysis of a beam profile comprises evaluating a combined signal Q from the respective sensor signals,
  viii) matching the reflection features to reference features of a reference image considering the initial distance information thereby determining pairs of matched reflection and reference features;
  ix) determining an epipolar line of the matched reference feature in the reference image for each of the pairs of matched reflection and reference features;
  x) determining an epipolar line distance d of the matched reflection feature to said epipolar line;
  xi) evaluating the epipolar line distances d as a function of an image position (x,y) in the reference image thereby determining a geometric pattern;
  xii) determining at least one correction for rotation and/or translation of the reflection image depending on the geometric pattern.

Embodiment 14 The method according to the preceding embodiment, wherein the method comprises correcting the reflection image based on the determined correction and determining at least one triangulation distance information of the reflection feature by using triangulation considering the determined correction.

Embodiment 15 A use of the detector according to any one of the preceding embodiments referring to a detector, for a purpose of use, selected from the group consisting of: a position measurement in traffic technology; an entertainment application; a security application; a surveillance application; a safety application; a human-machine interface application; a logistics application; a tracking application; an outdoor application; a mobile application; a communication application; a photography application; a machine vision application; a robotics application; a quality control application; a manufacturing application.

BRIEF DESCRIPTION OF THE FIGURES

Further optional details and features of the invention are evident from the description of preferred exemplary embodiments which follows in conjunction with the dependent claims. In this context, the particular features may be implemented in an isolated fashion or in combination with other features. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

DETAILED DESCRIPTION OF THE EMBODIMENTS

Figure 1:
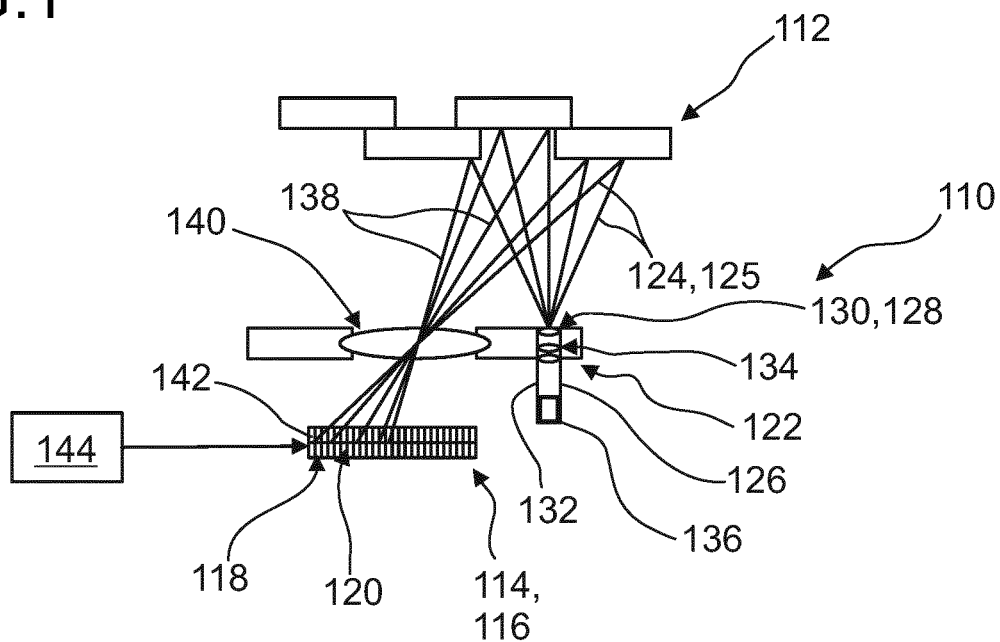
FIG. 1 shows an embodiment of a detector according to the present invention.

FIG. 1 shows in a highly schematic fashion an embodiment of a detector 110 for determining a position of at least one object 112 according to the present invention. The detector 110 comprises at least one sensor element 114 having a matrix 116 of optical sensors 118. The optical sensors 118 each have a light-sensitive area 120.

The sensor element 114 may be formed as a unitary, single device or as a combination of several devices. The matrix 116 specifically may be or may comprise a rectangular matrix having one or more rows and one or more columns. The rows and columns specifically may be arranged in a rectangular fashion. However, other arrangements are feasible, such as nonrectangular arrangements. As an example, circular arrangements are also feasible, wherein the elements are arranged in concentric circles or ellipses about a center point. For example, the matrix 116 may be a single row of pixels. Other arrangements are feasible.

The optical sensors 118 of the matrix 116 specifically may be equal in one or more of size, sensitivity and other optical, electrical and mechanical properties. The light-sensitive areas 120 of all optical sensors 118 of the matrix 116 specifically may be located in a common plane, the common plane preferably facing the object 112, such that a light beam propagating from the object to the detector 110 may generate a light spot on the common plane. The light-sensitive area 120 may specifically be located on a surface of the respective optical sensor 118. Other embodiments, however, are feasible.

The optical sensors 118 may comprise for example, at least one CCD and/or CMOS device. As an example, the optical sensors 118 may be part of or constitute a pixelated optical device. As an example, the optical sensors may be part of or constitute at least one CCD and/or CMOS device having a matrix of pixels, each pixel forming a light-sensitive area 120. Preferably the detector is configured such that the optical sensors 118 are exposed simultaneously within a certain time period, denoted as frame or imaging frame. For example, the optical sensors 118 may be part of or constitute at least one global shutter CMOS.

The optical sensors 118 specifically may be or may comprise photodetectors, preferably inorganic photodetectors, more preferably inorganic semiconductor photodetectors, most preferably silicon photodetectors. Specifically, the optical sensors 118 may be sensitive in the infrared spectral range. All of the optical sensors 118 of the matrix 116 or at least a group of the optical sensors 118 of the matrix 116 specifically may be identical. Groups of identical optical sensors 118 of the matrix 116 specifically may be provided for different spectral ranges, or all optical sensors may be identical in terms of spectral sensitivity. Further, the optical sensors 118 may be identical in size and/or with regard to their electronic or optoelectronic properties. The matrix 116 may be composed of independent optical sensors 118. Thus, a matrix 116 may be composed of inorganic photodiodes. Alternatively, however, a commercially available matrix may be used, such as one or more of a CCD detector, such as a CCD detector chip, and/or a CMOS detector, such as a CMOS detector chip.

The optical sensors 118 may form a sensor array or may be part of a sensor array, such as the above-mentioned matrix. Thus, as an example, the detector 110 may comprise an array of optical sensors 118, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that 0.3≤m/n≤3, such as by choosing m/n=1:1, 4:3, 16:9 or similar. As an example, the array may be a square array, having an equal number of rows and columns, such as by choosing m=2, n=2 or m=3, n=3 or the like.

The matrix 116 specifically may be a rectangular matrix having at least one row, preferably a plurality of rows, and a plurality of columns. As an example, the rows and columns may be oriented essentially perpendicular. In order to provide a wide range of view, the matrix 116 specifically may have at least 10 rows, preferably at least 50 rows, more preferably at least 100 rows. Similarly, the matrix may have at least 10 columns, preferably at least 50 columns, more preferably at least 100 columns. The matrix 116 may comprise at least 50 optical sensors 118, preferably at least 100 optical sensors 118, more preferably at least 500 optical sensors 118. The matrix 116 may comprise a number of pixels in a multi-mega pixel range. Other embodiments, however, are feasible.

The detector 110 further comprises a projector 122 for illuminating the object 112 with at least one illumination pattern 124. The projector 122 may comprise at least one laser source 126, in particular for generating at least one light beam. The projector 122 comprises the at least one diffractive optical element 128, in particular for generating and/or forming the illumination pattern 124 from the light beam of the laser source 126. The projector 122 may be configured such that the illumination pattern 124 propagates from the projector 122, in particular from at least one opening 130 of a housing of the projector 122, towards the object 112. The projector 122 may be configured for generating and/or to project a cloud of points, for example the projector 122 may comprise at least one digital light processing (DLP) projector, at least one LCoS projector, at least one laser source, at least one array of laser sources; at least one light emitting diode; at least one array of light emitting diodes. The laser source 126 may comprise focusing optics 134. The projector 122 may comprise a plurality of laser sources 126. Additionally, an additional illumination pattern may be generated by at least one ambient light source.

The projector 122 may comprise at least one control unit 136. The control unit 136 may be configured for controlling the laser source 126. The control unit 136 may comprise at least one processing device, in particular at least one processor and/or at least one application-specific integrated circuit (ASIC). The control unit 136 may comprise one or more programmable devices such as one or more computers, application-specific integrated circuits (ASICs), Digital Signal Processors (DSPs), or Field Programmable Gate Arrays (FPGAs) which are configured to perform the controlling of the laser source 126. The control unit 136 may comprise at least one processing device having a software code stored thereon comprising a number of computer commands. The control unit 136 may provide one or more hardware elements for performing controlling the laser source 126 and/or may provide one or more processors with software running thereon for performing controlling of the laser source. The control unit 136 may be configured to issue and/or to generate at least one electronic signal for controlling the laser source. The control unit 136 may have one or more wireless and/or wire-bound interfaces and/or other types of control connections for controlling the laser source 126. The control unit 136 and the laser source may be interconnected by one or more connectors and/or by one or more interfaces.

The illumination pattern 124 comprises a plurality of illumination features 125. The illumination pattern 124 may comprise at least one periodic regular pattern selected from the group consisting of: at least one periodic regular point pattern; at least one hexagonal pattern; at least one rectangular pattern.

For example, the projector 122 of FIG. 1 may comprise a single light source, in particular a single laser source 126, configured for generating at least one light beam, also denoted laser beam. The projector 122 may comprise the at least one transfer device, in particular the DOE 128, for diffracting and for replicating the laser beam generated by the single laser source for generating the illumination pattern 124 comprising the patterned illumination features. The diffractive optical element 128 may be configured for beam shaping and/or beam splitting.

For example, the projector 122 may comprise at least one array of densely packed light sources, in particular laser sources 126, according to a certain pattern configured for generating a cluster of light beams. The density of the laser sources 126 may depend on extension of a housing of the individual light sources and distinguishability of the light beams. The projector 122 may comprise the at least one transfer device, in particular the DOE 128, for diffracting and replicating the cluster of light beams for generating the illumination pattern 124 comprising patterned illumination features.

Each optical sensor 118 is designed to generate at least one sensor signal in response to an illumination of its respective light-sensitive area 120 by a reflection light beam propagating from the object 112 to the detector 110. Furthermore, the sensor element 114 is configured to determine at least one reflection image 142 comprising at least one reflection pattern 138. The reflection image 142 may comprise points as reflection features. These points result from reflection light beams originating from the object 112. The sensor element 114 may be configured to determine the reflection pattern 138. The reflection pattern 138 may comprise at least one feature corresponding to at least one illumination feature 125 of the illumination pattern 124. The reflection pattern 138 may comprise, in comparison to the illumination pattern 124, at least one distorted pattern, wherein the distortion depends on the distance of the object 112, such as surface properties of the object 112.

The detector 110 may comprise the at least one transfer device 140 comprising one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system. In particular, the transfer device 140 may comprise at least one collimating lens configured to focus at least one object point in an image plane.

The detector 110 comprises at least one evaluation device 144. The evaluation device 144 may be configured for selecting at least one reflection feature of the reflection image 142. The evaluation device 144 may be configured for selecting at least one feature of the reflection pattern 138 and to determine an initial distance information, i.e. the longitudinal coordinate of the selected feature of the reflection pattern, by evaluating a combined signal Q from the sensor signals, as described above. Thus, the detector 110 may be configured to pre-classify the at least one reflection feature of the reflection image 142.

The evaluation device 144 may be configured to perform at least one image analysis and/or image processing in order to identify the reflection feature. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator;

applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing an object within an image generated by the optical sensors 118.

The evaluation device 144 is configured for determining the initial distance information, i.e. at least one longitudinal coordinate z of the selected reflection feature of the reflection image 142, by evaluating a combined signal Q from the sensor signals. The evaluation device 144 may be configured for deriving the combined signal Q by one or more of dividing the sensor signals, dividing multiples of the sensor signals, dividing linear combinations of the sensor signals. The evaluation device 144 may be configured for using at least one predetermined relationship between the combined signal Q and the longitudinal region for determining the longitudinal region. For example, the evaluation device 144 may be configured for deriving the combined signal Q by $$Q(z_O) = \frac{\int\int_{A_1} E(x, y; z_O) dx dy}{\int\int_{A_2} E(x, y; z_O) dx dy}$$

wherein x and y are transversal coordinates, A1 and A2 are different areas of at least one beam profile of the reflection light beam at the sensor position, and $E(x,y,z_o)$ denotes the beam profile given at the object distance $z_o$. Area A1 and area A2 may differ. In particular, A1 and A2 are not congruent. Thus, A1 and A2 may differ in one or more of the shape or content. The beam profile may be a transverse intensity profile of the light beam. The beam profile may be a cross section of the light beam. The beam profile may be selected from the group consisting of a trapezoid beam profile; a triangle beam profile; a conical beam profile and a linear combination of Gaussian beam profiles. Generally the beam profile is dependent on luminance $L(z_o)$ and beam shape $S(x,y; z_o)$, $E(x,y; z_o)=L\cdot S$. Thus, by deriving the combined signal it may allow determining the longitudinal coordinate independent from luminance. In addition, using the combined signal allows determination of the distance $z_o$ independent from the object size. Thus, the combined signal allows determination of the distance $z_o$ independent from the material properties and/or reflective properties and/or scattering properties of the object and independent from alterations of the light source such as by manufacturing precision, heat, water, dirt, damages on the lens, or the like.

Each of the sensor signals may comprise at least one information of at least one area of the beam profile of the light beam. The light-sensitive areas 120 may be arranged such that a first sensor signal comprises information of a first area of the beam profile and a second sensor signal comprises information of a second area of the beam profile. The first area of the beam profile and second area of the beam profile may be one or both of adjacent or overlapping regions. The first area of the beam profile and the second area of the beam profile may be not congruent in area.

The evaluation device 144 may be configured to determine and/or to select the first area of the beam profile and the second area of the beam profile. The first area of the beam profile may comprise essentially edge information of the beam profile and the second area of the beam profile may comprise essentially center information of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. Preferably, the center information has a proportion of edge information of less than 10%, more preferably of less than 5%, most preferably the center information comprises no edge content. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A2 and the second area of the beam profile may be area A1. Similarly, the center signal and edge signal may also be determined by using segments of the beam profile such as circular segments of the beam profile. For example, the beam profile may be divided into two segments by a secant or a chord that does not pass the center of the beam profile. Thus, one segment will essentially contain edge information, while the other segment will contain essentially center information. For example, to further reduce the amount of edge information in the center signal, the edge signal may further be subtracted from the center signal.

The edge information may comprise information relating to a number of photons in the first area of the beam profile and the center information may comprise information relating to a number of photons in the second area of the beam profile. The evaluation device 144 may be configured for determining an area integral of the beam profile. The evaluation device 144 may be configured to determine the edge information by integrating and/or summing of the first area. The evaluation device 144 may be configured to determine the center information by integrating and/or summing of the second area. For example, the beam profile may be a trapezoid beam profile and the evaluation device may be configured to determine an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

The evaluation device 144 may be configured for using at least one predetermined relationship between the combined signal and the longitudinal coordinate. The predetermined relationship may be one or more of an empiric relationship, a semi-empiric relationship and an analytically derived relationship. The evaluation device 144 may comprise at least one data storage device for storing the predetermined relationship, such as a lookup list or a lookup table.

Depth measurements using beam profile analysis using the combined signal Q may allow reliable distance determination even in case of environment causing multiple reflections, with biasing light sources, or reflective measurement objects with reduced computational demand, in particular with reduced processing power. The beam profile analysis may allow estimating a depth map from the image of the sensor element 114. Specifically, the distance determined with beam profile analysis may provide a distance estimation per illumination feature 125 and can be refined by triangulation methods for known, and in particular fixed, positions of sensor element 114 and projector 122. In order to calculate a refined longitudinal coordinate using triangulation, the so-called correspondence problem needs to be solved. Generally, three dimensional reconstruction methods using triangulation require an extrinsic calibrated system. In case of an extrinsic calibrated system, each reflection feature can be matched to a reference grid point, i.e. a reference feature, with the estimated initial distance information of beam profile analysis. Therefore, each detected reflection feature can be matched to the corresponding reference grid point if the epipolar condition is fulfilled and the beam profile analysis yields a reliable depth estimation. However, the distance measurement based on triangulation would become very poorly if the correspondences are determined false. Depending on the hardware, pre-calibrated detectors may be degenerated by physical stress or temperature shifts, such that relative position and rotation changes in time. Changes in relative position of sensor element 114 and projector 122 would result to changes in the reflection image and erroneous determined correspondences of reference features and reflection features and thus, false distance measurement results. The present invention proposes performing a calibration method, in particular a recalibration, for determining extrinsic parameters of the detector 110. The calibration method according to the present invention may allow directly correcting false distance measurement values on the fly without starting a new static calibration process. In particular, the calibration method may be performed automatically such as without any user interaction.

The calibration may comprise at least one process for determining at least one extrinsic parameter of the detector 110 and/or determining a correction for measurement values of the detector 110, in particular of the position of the reflection features in the reflection image. The evaluation device 144 may be configured for determining at least one extrinsic parameter of the detector 110. The extrinsic parameter may comprise at least one parameter selected from the group consisting of: rotation angles between the projector 122 and coordinates of the sensor element 114, translation components between the projector 122 and coordinates of the sensor element 114, aperture angles, center of the sensor element 114, apertures, focal distance.

The calibration method comprises matching the reflection features to reference features of the reference image considering the initial distance information thereby determining pairs of matched reflection and reference features. The evaluation device 144 may be configured for matching respectively one of the reflection features with respectively one of the reference features within the displacement region by using at least one linear scaling algorithm. The beam profile analysis may allow reducing the number of possibilities.

The evaluation device 144 may be configured for determining the at least one reference feature in the at least one reference image corresponding to the at least one reflection feature. The evaluation device 144 may be configured for performing an image analysis and for identifying features of the reflection image. The evaluation device 144 may be configured for identifying at least one reference feature in the reference image having an essentially identical longitudinal coordinate as the selected reflection feature. The reference feature corresponding to the reflection feature may be determined using epipolar geometry. For description of epipolar geometry reference is made, for example, to chapter 2 in X. Jiang, H. Bunke: "Dreidimensionales Computersehen", Springer, Berlin Heidelberg, 1997. Epipolar geometry may assume that the reference image and the reflection image may be images of the object determined at different spatial positions and/or spatial orientations having a fixed distance. The reference image and the reflection image may be images of the object determined at different spatial positions having a fixed distance. The evaluation device 144 may be configured for determining an epipolar line in the reference image. An assumed relative position of the reference image and reflection image may be known. For example, an assumed relative position of the reference image may be determined in a preceding or historic calibration, in which steps a) to e) have been performed. For example, an assumed relative position of the reference image and reflection image may be a manufacturer value. For example, an assumed relative position of the reference image and reflection image may be stored within at least one storage unit of the evaluation device. The evaluation device 144 may be configured for determining a straight line extending from a selected reflection feature of the reflection image. The straight line may comprise possible reflection features corresponding to the selected reflection feature. The straight line and the baseline span an epipolar plane. As the reference image is determined at a different relative position from the reflection image, the corresponding possible reflection features may be imaged on a straight line, called epipolar line, in the reference image. Thus, a reference feature of the reference image corresponding to the selected reflection feature of the reflection image are assumed to lie on the epipolar line. However, as outlined above, due to distortions of the image or changes in the extrinsic parameters such as due to ageing, temperature changes, mechanical stress or the like, epipolar lines may intersect or be very close to each other and/or the correspondence between reference feature and reflection feature may be unclear.

The evaluation device 144 may be configured for determining, for each reflection feature, a longitudinal region of the reflection feature. The longitudinal region may be given by the initial distance information of the reflection feature determined from the combined signal Q and an error interval ±ε. The evaluation device 144 may be configured for determining at least one displacement region in the reference image corresponding to the longitudinal region. The displacement region may be a region in the reference image in which the reference feature corresponding to the selected reflection feature may be imaged. Specifically, the displacement region may be a region in the reference image in which the reference feature corresponding to the selected reflection feature is expected to be located in the reference image. Depending on the distance to the object, an image position of the reference feature corresponding to the reflection feature may be displaced within the reference image compared to an image position of the reflection feature in the reflection image. The displacement region may comprise only one reference feature. The displacement region may also comprise more than one reference feature.

The displacement region may comprise an epipolar line or a section of an epipolar line. The displacement region may comprise more than one epipolar line or more sections of more than one epipolar line. The displacement region may extend along the epipolar line, orthogonal to an epipolar line, or both. The evaluation device 144 may be configured for determining the reference feature along the epipolar line corresponding to the initial distance information and to determine an extent of the displacement region along the epipolar line corresponding to the error interval ±ε or orthogonal to an epipolar line. The measurement uncertainty of the distance measurement using the combined signal Q may result in a displacement region which is noncircular since the measurement uncertainty may be different for different directions. Specifically, the measurement uncertainty along the epipolar line or epipolar lines may be greater than the measurement uncertainty in an orthogonal direction with respect to the epipolar line or epipolar lines. The displacement region may comprise an extent in an orthogonal direction with respect to the epipolar line or epipolar lines. The evaluation device may be configured for matching a selected reflection feature with at least one reference feature within the displacement region. The evaluation device 144 may be configured for matching the selected feature of the reflection image with the reference feature within the displacement region by using at least one evaluation algorithm considering the determined initial distance information. The evaluation algorithm may be a linear scaling algorithm. The evaluation device 144 may be configured for determining the epipolar line closest to and/or within the displacement region. The evaluation device may be configured for determining the epipolar line closest to the image position of the reflection feature. The extent of the displacement region along the epipolar line may be larger than the extent of the displacement region orthogonal to the epipolar line. The evaluation device 144 may be configured for determining an epipolar line before determining a corresponding reference feature. The evaluation device 144 may determine a displacement region around the image position of each reflection feature. The evaluation device 144 may be configured for assigning an epipolar line to each displacement region of each image position of the reflection features, such as by assigning the epipolar line closest to a displacement region and/or within a displacement region and/or closest to a displacement region along a direction orthogonal to the epipolar line. The evaluation device 144 may be configured for determining the reference feature corresponding to the image position of the reflection feature by determining the reference feature closest to the assigned displacement region and/or within the assigned displacement region and/or closest to the assigned displacement region along the assigned epipolar line and/or within the assigned displacement region along the assigned epipolar line.

Additionally or alternatively, the evaluation device 144 may be configured to perform the following steps:
  Determining the displacement region for the image position of each reflection feature;
  Assigning an epipolar line to the displacement region of each reflection feature such as by assigning the epipolar line closest to a displacement region and/or within a displacement region and/or closest to a displacement region along a direction orthogonal to the epipolar line;
  Assigning and/or determining at least one reference feature to each reflection feature such as by assigning the reference feature closest to the assigned displacement region and/or within the assigned displacement region and/or closest to the assigned displacement region along the assigned epipolar line and/or within the assigned displacement region along the assigned epipolar line.

Additionally or alternatively, the evaluation device 144 may be configured for deciding between more than one epipolar line and/or reference feature to be assigned to a reflection feature such as by comparing distances of reflection features and/or epipolar lines within the reference image and/or by comparing error weighted distances, such as ε-weighted distances of reflection features and/or epipolar lines within the reference image and assigning the epipolar line and/or reference feature in shorter distance and/or ε-weighted distance to the reference feature and/or reflection feature.

As outlined above, the detector 110, in particular the evaluation device 144, may be configured for pre-classifying the selected reflection feature using the combined signal Q such that an unambiguous assignment to one reference feature is possible. In particular, illumination features of the illumination pattern may be arranged such that corresponding reference features of the reference image may have a relative distance to each other as large as possible on the epipolar line. The illumination features of the illumination pattern may be arranged such that only few reference features are positioned on the epipolar line.

Using the beam profile analysis may allow estimating the initial distance information, such as a longitudinal coordinate within the error interval. By determining the displacement region corresponding to the initial distance information and the corresponding error interval may allow reducing the possible number of solutions along the epipolar line for matching reference and reflection features significantly. The number of possible solutions may even be reduced to one. Determining of the initial distance information may be performed during a pre-evaluation before matching the reflection features and reference features. This may allow reducing the computational demand such that it is possible to significantly reduce costs and to allow a use in mobile device or outdoor devices.

The calibration method comprises determining an epipolar line of the matched reference feature in the reference image for each of the pairs of matched reflection and reference features. In particular, the epipolar line used for matching the respectively matched reference and reflection feature may be used as epipolar line of said pair of matched reflection and reference features.

The calibration method further comprises determining an epipolar line distance d of the matched reflection feature to said epipolar line. The epipolar line distance may be a distance of the reflection feature and the epipolar line used for matching with the matched reference feature, denoted as corresponding epipolar line. The distance may be determined by determining image coordinates of the reflection image and of the corresponding epipolar line and comparing the image coordinates. A minimum distance to the corresponding epipolar line may be used as epipolar line distance.

Figure 2:
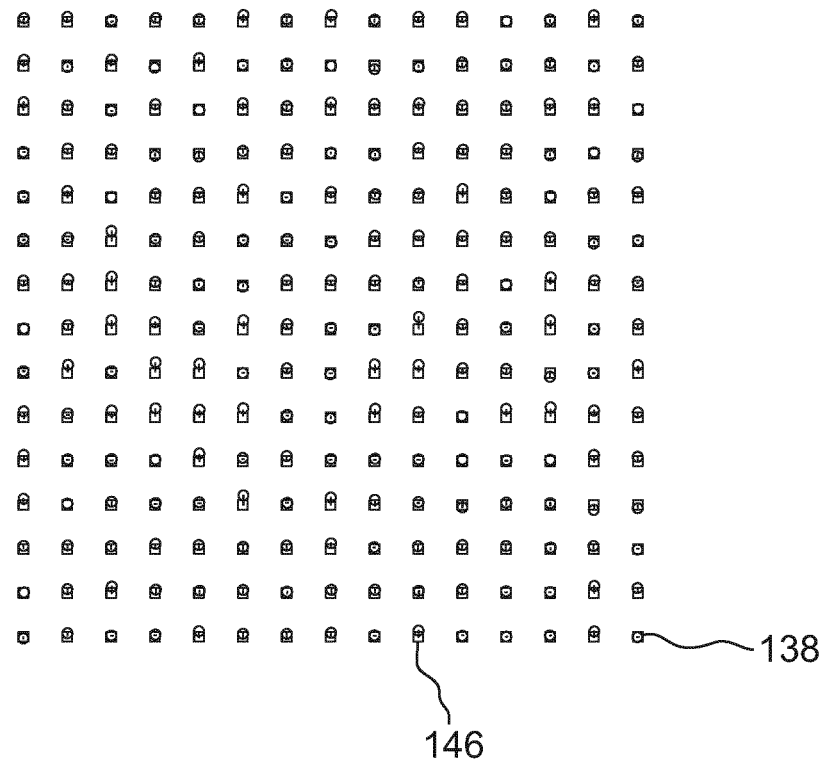
FIG. 2 shows a reflection pattern of a calibrated detector matched to a reference pattern.

In case of a good extrinsic calibration the epipolar line distance is close to zero. Such a reflection pattern 138 (circles) of a calibrated detector 110 matched to a reference pattern 146 (squares) is shown in FIG. 2.

Figure 3A:
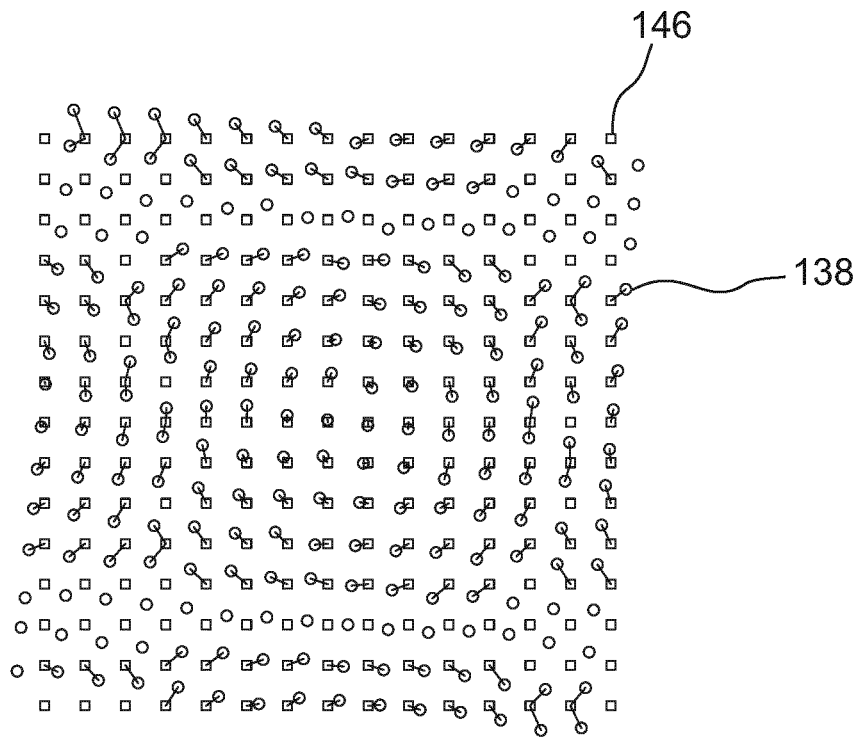
FIGS. 3A and 3B show embodiments of reflection patterns of a decalibrated detector (rotated) matched to the reference pattern.
Figure 3B:
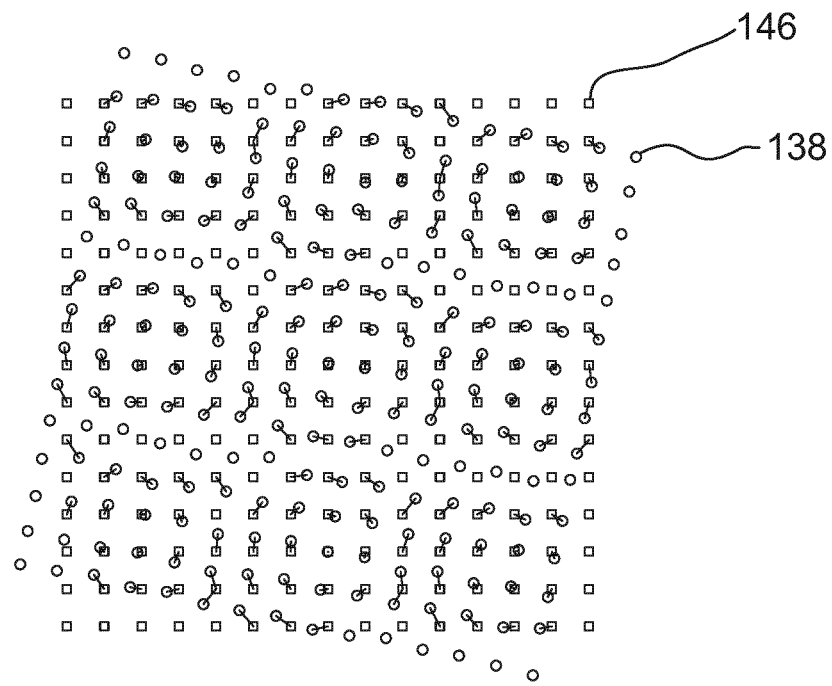

In case the detector is decalibrated, the reflection features may to match probably to the reference features. FIGS. 3A and 3B show two embodiments of reflection patterns 138 (circles) of a decalibrated detector 110, in case of rotated sensor element 114 and/or projector 122, matched to the reference pattern 146 (squares). However, it may always possible to determine the epipolarline distance to a false or true corresponding reference feature. In the matching step, a used reconstruction algorithm may match reflection features to reference features if the epipolarline distance is in the tolerance range. Therefore, it may be possible, that the reflection feature is matched to a false reference feature, resulting in a non-zero epipolar line distance.

The evaluation device 144 may be configured for performing steps b) to e) even if also false pairs of matched reflection and reference features are determined. The calibration method may be based on evaluating the resulting epipolar line distances. The calibration method may consider epipolar distances independent from the fact if the correspondence between reflection and reference feature is correct or false. The epipolar distance may be suitable for the proposed calibration strategy even if the reflection features are matched to the wrong reference features.

Figure 4:
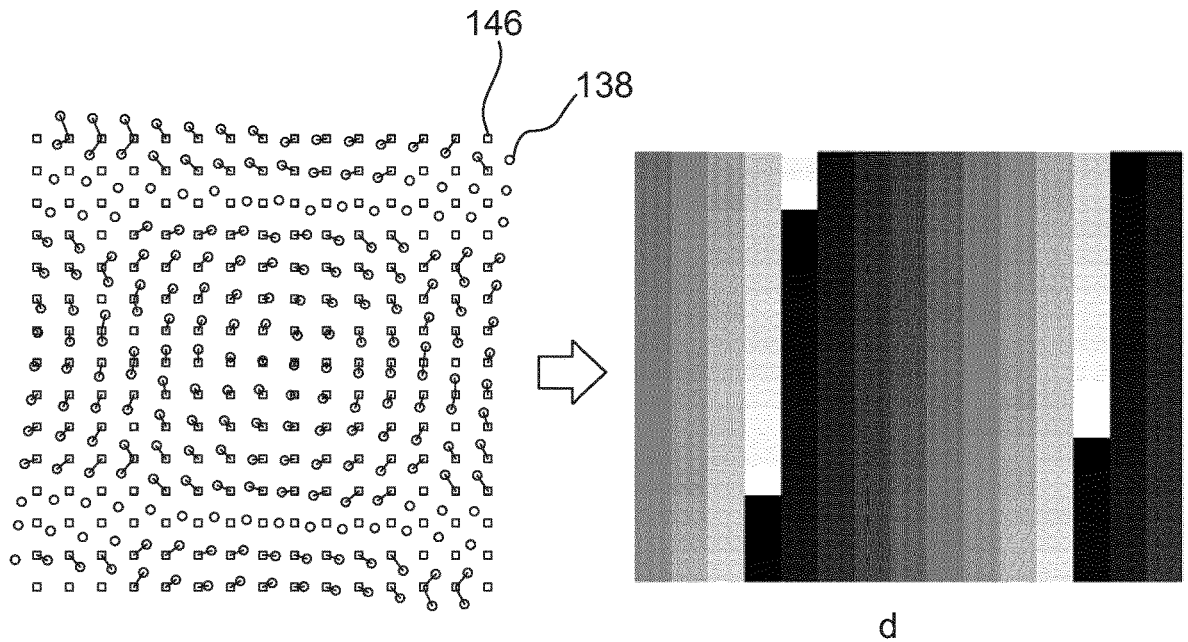
FIG. 4 shows a further embodiment of a reflection pattern and matched reference pattern and an evaluated epipolarline distance function d(x,y)

Step d) comprises evaluating the epipolar line distances d as a function of an image position (x,y) in the reference image thereby determining a geometric pattern. The geometric pattern may be a distribution of epipolar line distances. The epipolarline distances may be defined as a function d(x,y) on the position (x,y) of the reference image. The epipolarline distance function d can be analyzed to compute the correction for rotation and/or translation. In case of a decalibrated system, the function d may generate a geometric pattern. The shape of this geometric pattern of the epipolarline distance function may show uniquely the degree of decalibration. The geometric pattern like repetitions, steepness, discontinuities, and curvatures in the function d(x,y) can be used to recover the calibration. If the rotation and/or translation of the projector and/or sensor element changes, this result can be observed in the function d as geometric pattern. The evaluation device 144 may be configured for performing an algorithm designed for analyzing d(x,y) and for computing a correction for the rotation and/or translation. The evaluation device 144 may be configured for determining the correction of the reflection image by evaluating one or more of shape, repetitions, steepness, discontinuities, and curvatures of the geometric pattern. FIG. 4 shows a further embodiment of a reflection pattern and matched reference pattern on the left side and an evaluated epipolarline distance function d(x,y) on the right side.

The evaluation device 144 may be configured for correcting the reflection image based on the determined correction. As outlined above, the reflection image refers to an evaluation of the image of the optical sensor with regard to at least one feature and/or transformation of extrinsic parameters such as rotation and translation. The correction for rotation and/or translation of the reflection image may be at least one correction factor applied to the image positions of the reflection image. The evaluation device 144 may be configured for determining if the geometric pattern agrees within pre-defined tolerances to a geometric pattern of a calibrated detector or if the geometric pattern deviates from the geometric pattern of a calibration by more than predefined tolerances. The determined correction may give information about the degree of decalibration. If the detector is already optimally calibrated, then the correction step may be very small and the correction may have a very small effect, too. In case of agreement within tolerances, the evaluation device 144 may maintain initial extrinsic parameters and/or correction of the reflection image may be discarded. Otherwise the correction may be applied to the reflection image. The determined correction may be used for correcting rotation and/or translation. Rotation and translation describe a spatial context between the sensor element and the projector. Rotation and translation may comprise the relation between "reflection features" to "reference features". From this relation the triangulation distance information can be calculated by using triangulation techniques. Thus, in case of determined changes in rotation and/or translation, the resulting triangulation information may be corrected.

The evaluation device 144 may be configured for determining at least one triangulation distance information of the reflection feature by using triangulation considering the determined correction. The evaluation device 144 may be configured for determining a displacement of a matched reference feature and reflection feature. The displacement may be a difference between a position in the reference image to a position in the reflection image. The evaluation device may be configured for determining the triangulation distance of the matched reference feature using a predetermined relationship between a longitudinal coordinate and the displacement. The evaluation device 144 is configured for performing the calibration method on the fly during determining the triangulation distance information.

Figure 5:
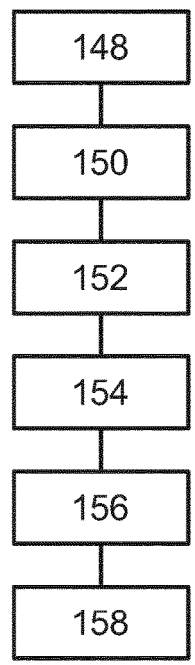
FIG. 5 shows an exemplary flow chart of an embodiment of a method for calibrating at least one detector according to the present invention.

FIG. 5 shows an exemplary flow chart of an embodiment of a method for calibrating at least one detector according to the present invention. The method comprises the following steps:

i) (denoted with reference number 148) determining initial distance information by
illuminating the object with at least one illumination pattern generated by the at least one projector of the detector, wherein the illumination pattern comprises a plurality of illumination features;
generating for each reflection light beam impinging on the light-sensitive areas of the optical sensors of the sensor element having a matrix of optical sensors at least one sensor signal in response to an illumination;
determining at least one reflection image by using the sensor element comprising a plurality of reflection features, wherein each of the reflection features comprises a beam profile;
by using at least one evaluation device, evaluating the sensor signals thereby determining a combined signal Q and determining the initial distance information of the reflection features by analysis of their respective beam profiles, wherein the analysis of a beam profile comprises evaluating a combined signal Q from the respective sensor signals, ii) (denoted with reference number 150) matching the reflection features to reference features of a reference image considering the initial distance information thereby determining pairs of matched reflection and reference features;

iii) (denoted with reference number 152) determining an epipolar line of the matched reference feature in the reference image for each of the pairs of matched reflection and reference features;

iv) (denoted with reference number 154) determining an epipolar line distanced of the matched reflection feature to said epipolar line;

v) (denoted with reference number 156) evaluating the epipolar line distances d as a function of an image position (x,y) in the reference image thereby determining a geometric pattern;

vi) (denoted with reference number 158) determining at least one correction for rotation and/or translation of the reflection image depending on the geometric pattern.

LIST OF REFERENCE NUMBERS 110 detector
112 object 114 sensor element
116 matrix
118 optical sensor
120 light-sensitive area
122 projector
124 illumination pattern
125 illumination feature
126 laser source
128 DOE
130 opening
132 housing
134 optics
136 control unit
138 reflection pattern
140 transfer device
142 reflection image
144 evaluation device
146 reference pattern
148 determining initial distance information
150 matching
152 determining an epipolar line
154 determining an epipolar line distance
156 evaluating the epipolar line distances
158 determining at least one correction

The invention claimed is:

1. A detector for determining a position of at least one object, the detector comprising:
    at least one projector for illuminating the object with at least one illumination pattern, wherein the illumination pattern comprises a plurality of illumination features;
    at least one sensor element having a matrix of optical sensors, the optical sensors each having a light-sensitive area, wherein each optical sensor is designed to generate at least one sensor signal in response to an illumination of its respective light-sensitive area by a reflection light beam propagating from the object to the detector, wherein the sensor element is configured to determine at least one reflection image comprising a plurality of reflection features, wherein each of the reflection features comprises a beam profile; and
    at least one evaluation device configured for determining initial distance information of the reflection features by analysis of their respective beam profiles, wherein the analysis of a beam profile comprises evaluating a combined signal Q from the at least one sensor signal, wherein the evaluation device is configured for performing a calibration method comprising:
    a) matching the reflection features to reference features of a reference image using the initial distance information thereby determining pairs of matched reflection and reference features;
    b) determining an epipolar line of the matched reference feature in the reference image for each of the pairs of matched reflection and reference features;
    c) determining an epipolar line distance d of a center of the matched reflection feature to said epipolar line;
    d) evaluating the epipolar line distances d as a function of an image position (x,y) in the reference image thereby determining a geometric pattern; and
    e) determining at least one correction for rotation and/or translation of the reflection image depending on the geometric pattern.

2. The detector according to claim 1, wherein the evaluation device is configured for correcting the reflection image based on the determined correction.

3. The detector according to claim 1, wherein the evaluation device is configured for determining at least one triangulation distance information of the reflection feature by using triangulation considering the determined correction.

4. The detector according to claim 1, wherein the evaluation device is configured for performing the calibration method on the fly during determining the triangulation distance information.

5. The detector according to claim 1, wherein the evaluation device is configured for determining at least one extrinsic parameter of the detector, wherein the extrinsic parameter comprise at least one parameter selected from the group consisting of: rotation angles between the projector and coordinates of the sensor element, translation components between the projector and coordinates of the sensor element, aperture angles, center of the sensor element, apertures, focal distance.

6. The detector according to claim 1, wherein the evaluation device is configured for performing steps b) to e) even if also false pairs of matched reflection and reference features are determined.

7. The detector according to claim 1, wherein the evaluation device is configured for determining the correction of the reflection image by evaluating one or more of shape, repetitions, steepness, discontinuities, and curvatures of the geometric pattern.

8. The detector according to claim 1, wherein the illumination pattern comprises at least one periodic regular pattern selected from the group consisting of: at least one periodic regular point pattern; at least one hexagonal pattern; at least one rectangular pattern.

9. The detector according to claim 8, wherein the projector is configured for generating a cloud of points such that the illumination pattern comprises a plurality of point features.

10. The detector according to claim 1, wherein the light beam may have a non-Gaussian beam profile.

11. The detector according to claim 1, wherein the projector is configured to generate two or more illumination patterns each comprising a plurality of illumination features.

12. The detector according to claim 1, wherein the projector comprises a diffractive optical element.

13. The detector according to claim 10, wherein the diffractive optical element for diffracting and replicating the light beam.

14. The detector according to claim 1, wherein the projector comprises an array of laser sources.

15. The detector according to claim 1, wherein the optical sensors are sensitive in the range of 780 nm to 3.0 micrometers.

16. The detector according to claim 14, wherein the projector comprises an array of laser sources.

17. The detector according to claim 1, wherein the evaluation device is configured for deriving the combined signal Q by one or more of dividing the sensor signals, dividing multiples of the sensor signals, dividing linear combinations of the sensor signals, wherein the evaluation device is configured for using at least one predetermined relationship between the combined signal Q and the longitudinal coordinate for determining the initial distance information.

18. The detector according to claim 16, wherein the evaluation device is configured to determine the combined signal Q based on a first area of the beam profile and a second area of the beam profile, wherein the first area of the beam profile comprises essentially edge information of the beam profile and the second area of the beam profile comprises essentially center information of the beam profile.

19. The detector according to claim 1, wherein the evaluation device is configured for performing an image analysis of the reflection image thereby identifying reflections features of the reflection image.

20. The detector according to claim 1, wherein the evaluation device is configured for identifying at least one reference feature in the reference image having an essentially identical longitudinal coordinate as the selected reflection feature.

21. The detector according to claim 1, wherein the evaluation device is configured for deciding between more than one epipolar line and/or reference feature to be assigned to a reflection feature such as by comparing distances of reflection features and/or epipolar lines within the reference image and/or by comparing error weighted distances.

22. The detector according to claim 1, wherein the evaluation device is configured for using the epipolar line for matching the respectively matched reference and reflection feature as epipolar line of said pair of matched reflection and reference features.

23. The detector according to claim 1, wherein the evaluation device is configured for pre-classifying the selected reflection feature using the combined signal Q such that an unambiguous assignment to one reference feature is possible.

24. The detector according to claim 1, wherein the evaluation device is configured for deriving the combined signal Q by $$Q(z_O) = \frac{\int\int_{A_1} E(x, y; z_O) dx dy}{\int\int_{A_2} E(x, y; z_O) dx dy},$$

wherein x and y are transversal coordinates, A1 and A2 are different areas of at least one beam profile of the reflection light beam at the sensor position, and $E(x,y,z_o)$ denotes the beam profile given at the object distance $z_o$.

25. The detector according to claim 1, wherein the evaluation device is configured for determining, for each reflection feature, a longitudinal region of the reflection feature, wherein the longitudinal region is given by the initial distance information of the reflection feature determined from the combined signal Q and an error interval ±ε, wherein the evaluation device is configured for determining at least one displacement region in the reference image corresponding to the longitudinal region.

26. The detector according to claim 25, wherein the evaluation device is configured for matching respectively one of the reflection features with respectively one of the reference features within the displacement region by using at least one linear scaling algorithm.

27. The detector according to claim 1, wherein the evaluation device is configured for correcting the reflection image based on the determined correction.

28. A method for calibrating at least one detector, the at least one detector comprising:
at least one projector for illuminating the object with at least one illumination pattern, wherein the illumination pattern comprises a plurality of illumination features;
at least one sensor element having a matrix of optical sensors, the optical sensors each having a light-sensitive area, wherein each optical sensor is designed to generate at least one sensor signal in response to an illumination of its respective light-sensitive area by a reflection light beam propagating from the object to the detector, wherein the sensor element is configured to determine at least one reflection image comprising a plurality of reflection features, wherein each of the reflection features comprises a beam profile; and
at least one evaluation device configured for determining initial distance information of the reflection features by analysis of their respective beam profiles, wherein the analysis of a beam profile comprises evaluating a combined signal Q from the at least one sensor signal, wherein the method comprises the following steps:
i) determining initial distance information by illuminating the object with at least one illumination pattern generated by the at least one projector of the detector, wherein the illumination pattern comprises a plurality of illumination features;
generating for each reflection light beam impinging on the light-sensitive areas of the optical sensors of the sensor element having a matrix of optical sensors at least one sensor signal in response to an illumination;
determining at least one reflection image by using the sensor element comprising a plurality of reflection features, wherein each of the reflection features comprises a beam profile; and
by using at least one evaluation device, evaluating the sensor signals thereby determining a combined signal Q and determining the initial distance information of the reflection features by analysis of their respective beam profiles, wherein the analysis of a beam profile comprises evaluating a combined signal Q from the respective sensor signals,
ii) matching the reflection features to reference features of a reference image using the initial distance information thereby determining pairs of matched reflection and reference features;
iii) determining an epipolar line of the matched reference feature in the reference image for each of the pairs of matched reflection and reference features;
iv) determining an epipolar line distance d of a center of the matched reflection feature to said epipolar line;
V evaluating the epipolar line distances d as a function of an image position (x,y) in the reference image thereby determining a geometric pattern; and
vi) determining at least one correction for rotation and/or translation of the reflection image depending on the geometric pattern.

29. The method according to claim 28, wherein the method comprises correcting the reflection image based on the determined correction and determining at least one triangulation distance information of the reflection feature by using triangulation considering the determined correction.

30. A non-transient computer-readable medium including instructions that, when executed by one or more processors, cause the one or more processors to fully or partially perform the following steps:
i) determining initial distance information by
illuminating the object with at least one illumination pattern generated by the at least one projector of a detector, wherein the illumination pattern comprises a plurality of illumination features;
generating for each reflection light beam impinging on the light-sensitive areas of the optical sensors of the sensor element having a matrix of optical sensors at least one sensor signal in response to an illumination;

determining at least one reflection image by using the sensor element comprising a plurality of reflection features, wherein each of the reflection features comprises a beam profile; and by using at least one evaluation device, evaluating the at least one sensor signal thereby determining a combined signal Q and determining the initial distance information of the reflection features by analysis of their respective beam profiles, wherein the analysis of a beam profile comprises evaluating a combined signal Q from the at least one sensor signal, ii) matching the reflection features to reference features of a reference image using the initial distance information thereby determining pairs of matched reflection and reference features;

iii) determining an epipolar line of the matched reference feature in the reference image for each of the pairs of matched reflection and reference features;

iv) determining an epipolar line distance d of a center of the matched reflection feature to said epipolar line;

v) evaluating the epipolar line distances d as a function of an image position (x,y) in the reference image thereby determining a geometric pattern; and vi) determining at least one correction for rotation and/or translation of the reflection image depending on the geometric pattern.

\* \* \* \* \*